(12) United States Patent
Wang et al.

(10) Patent No.: US 9,288,496 B2
(45) Date of Patent: Mar. 15, 2016

(54) VIDEO CODING USING FUNCTION-BASED SCAN ORDER FOR TRANSFORM COEFFICIENTS

(75) Inventors: Xianglin Wang, San Diego, CA (US); Rajan L. Joshi, San Diego, CA (US); Muhammed Zeyd Coban, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1169 days.

(21) Appl. No.: 13/237,412

(22) Filed: Sep. 20, 2011

(65) Prior Publication Data

US 2012/0140822 A1 Jun. 7, 2012

Related U.S. Application Data

(60) Provisional application No. 61/419,732, filed on Dec. 3, 2010, provisional application No. 61/450,505, filed on Mar. 8, 2011, provisional application No. 61/502,779, filed on Jun. 29, 2011.

(51) Int. Cl.
*H04N 7/12* (2006.01)
*H04N 19/14* (2014.01)
(Continued)

(52) U.S. Cl.
CPC .............. *H04N 19/14* (2014.11); *H04N 19/129* (2014.11); *H04N 19/176* (2014.11); *H04N 19/196* (2014.11); *H04N 19/197* (2014.11)

(58) Field of Classification Search
CPC ... H04N 19/129; H04N 19/14; H04N 19/176; H04N 19/196; H04N 19/197

USPC ........................................ 375/240.12, 240.03
See application file for complete search history.

(56) References Cited

U.S. PATENT DOCUMENTS 7,215,384 B2  5/2007 McVeigh et al.
2003/0156648 A1* 8/2003 Holcomb ............. H04N 19/136
                                                  375/240.18

(Continued)

FOREIGN PATENT DOCUMENTS

EP          0827345 A1    3/1998

OTHER PUBLICATIONS

International Search Report and Written Opinion of international application No. PCT/US2011/061222, dated Feb. 22, 2012, 13 pp.

(Continued)

*Primary Examiner* — Jessica M Prince
(74) *Attorney, Agent, or Firm* — Shumaker & Sieffert, P.A.

(57) ABSTRACT

Video coding devices and methods use a function-based definition of scan order to scan transform coefficients associated with a block of residual video data. A video coder may define a scan order for coefficients based on a predefined function and one or more parameter values. A video encoder may use a function-based scan order to scan a two-dimensional array of coefficients to produce a one-dimensional array of coefficients for use in producing encoded video data. The video encoder may signal the parameters to a video decoder, or the video decoder may infer one or more of the parameters. The video decoder may use the function-based scan order to scan a one-dimensional array of coefficients to reproduce the two-dimensional array of coefficients for use in producing decoded video data. In each case, the scan order may vary according to the parameter values, which may include block size, orientation, and/or orientation strength.

39 Claims, 14 Drawing Sheets

(51) Int. Cl.
  *H04N 19/196* (2014.01)
  *H04N 19/176* (2014.01)
  *H04N 19/129* (2014.01)

(56) References Cited

U.S. PATENT DOCUMENTS

| | | | |
|---|---|---|---|
| 2005/0078754 A1* | 4/2005 | Liang | H04N 19/00 375/240.18 |
| 2007/0053436 A1 | 3/2007 | Van Eggelen et al. | |
| 2008/0310504 A1 | 12/2008 | Ye et al. | |
| 2008/0310745 A1* | 12/2008 | Ye | H04N 19/61 382/238 |
| 2009/0046941 A1* | 2/2009 | Mietens | H04N 19/176 382/250 |
| 2009/0154820 A1 | 6/2009 | Li et al. | |
| 2010/0020867 A1 | 1/2010 | Wiegand et al. | |

OTHER PUBLICATIONS

Karczewicz, M. et al., "Video Coding Technology Proposal by Qualcomm Inc." Joint Collaborative Team on Video Coding, Document: JCTVC-A121, Apr. 15-23, 2010, 24 pp.

Coban, et al., "Low complexity adaptive coefficient scanning[online]," JCTVC-C250,<URL:http://phenix.it-sudparis.eu/jct/doc_end_user/documents/3_Guangzhou/wg11/JCTVC-C250-m18291-v1-JCTVC-C250.zip>, Oct. 15, 2010, 3 pp.

Seregin, et al., "Low-complexity adaptive coefficients scanning", 94. MPEG Meeting; Oct. 11, 2010-Oct. 15, 2010; Guangzhou; (Motion Picture Expert Group or ISO/IEC JTC1/SC29/WG11), No. M18243, XP030046833, 4 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Notice of Grounds for Rejection from counterpart Korean Patent Application No. 2013-701734, dated Aug. 26, 2014, 6 pp.

Office Action from counterpart Japanese Application No. 2013-542035, dated Jun. 24, 2014, 6 pp.

Auyeung, et al., "Intra Coding with Directional OCT and Directional DWT," JCT-VC Meeting; Jul. 21, 2010-Jul. 28, 2010; Geneva; (Joint Collaborativeteam on Video Coding of 180/IEC JTC11SC29/WG11 and ITU-T SG.16 ); URL:http://wftp3.1tu.int/av-arch/ jctvc-site/, No. JCTVC-B1 07, 28 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 2011, JCTVC-G1103_d2, 214 pp.

Bross et al., "High efficiency video coding (HEVC) text specification draft 6," 7th Meeting: Geneva, CH, Nov. 21-30, 2011, JCTVC-H1003, 259 pp.

Bross et al., "High efficiency video coding (HEVC) text specification draft 7," 9th Meeting: Geneva, CH, Apr. 27-May 7, 2012, JCTVC-I1003_d21, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High Efficiency Video Coding (HEVC) text specification draft 9," 11th Meeting: Shanghai, CN, Oct. 10-19, 2012, JCTVC-K1003_v7, 290 pp.

Bross et al., "High Efficiency Video Coding (HEVC) text specification draft 10," 12th Meeting: Geneva, CH, Jan. 14-23, 2013, JCTVC-L1003_v34, 310 pp.

Chujoh et al., "Video coding technology proposal by Toshiba", 1. JCT-VC Meeting (Joint Collaborative Team on Video Coding of ISO/IEC JTC1/SC291WG11 and ITU-TSG.16), Apr. 18, 2010, 38 pp.

International Preliminary Report on Patentability from International application No. PCT/US2011/061222, dated Feb. 21, 2013, 7 pp.

Reply to Written Opinion dated Feb. 22, 2012, from International application No. PCT/US2011/061222, filed Jul. 2, 2012, 23 pp.

Second Written Opinion of the International Preliminary Examining Authority, from International application No. PCT/US2011/061222, dated Nov. 8, 2012, 5 pp.

Reply to Written Opinion dated Nov. 8, 2012, from International application No. PCT/US2011/061222, filed Jan. 7, 2013, 22 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011,193 pp.

Response to counterpart European Office Action dated Sep. 26, 2014, filed on Jan. 26, 2015, 6 pp.

\* cited by examiner

|  a  |  b  |  c  |  d  |
|-----|-----|-----|-----|
|  0  |  1  |  2  |  3  |
|  e  |  f  |  g  |  h  |
|  4  |  5  |  6  |  7  |
|  i  |  j  |  k  |  l  |
|  8  |  9  | 10  | 11  |
|  m  |  n  |  o  |  p  |
| 12  | 13  | 14  | 15  |

FIG. 9

|  a  |  b  |  c  |  d  |
|-----|-----|-----|-----|
|  0  |  1  |  2  |  4  |
|  e  |  f  |  g  |  h  |
|  3  |  5  |  7  | 10  |
|  i  |  j  |  k  |  l  |
|  6  |  8  | 11  | 13  |
|  m  |  n  |  o  |  p  |
|  9  | 12  | 14  | 15  |

FIG. 10

|  a  |  b  |  c  |  d  |
|:---:|:---:|:---:|:---:|
|  0  |  1  |  2  |  3  | THRES[0]=4
|  e  |  f  |  g  |  h  |
|  4  |  5  |  6  |  8  | THRES[1]=3
|  i  |  j  |  k  |  l  |
|  7  |  9  | 11  | 13  | THRES[2]=2
|  m  |  n  |  o  |  p  |
| 10  | 12  | 14  | 15  | THRES[3]=1

FIG. 11

VIDEO CODING USING FUNCTION-BASED SCAN ORDER FOR TRANSFORM COEFFICIENTS

This application claims the benefit of U.S. Provisional Application No. 61/502,779, filed Jun. 29, 2011, U.S. Provisional Application No. 61/450,505, filed Mar. 8, 2011, and U.S. Provisional Application No. 61/419,732, filed Dec. 3, 2010, the entire content of each of which is hereby incorporated by reference.

TECHNICAL FIELD

This disclosure relates to video coding and, more particularly, techniques for scanning residual transform coefficients for video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding. The scan order may be selected to separately group non-zero coefficients and zero-valued coefficients to promote efficiency of entropy coding processes, such as run-length coding of zero-valued coefficients.

SUMMARY

In general, this disclosure describes devices and methods for video coding using a function-based definition of scan order to scan transform coefficients associated with a block of residual video data. A video coder may define a scan order for transform coefficients based at least in part on a predefined function and one or more parameter values for the function.

A video encoder, for example, may use a function-based scan order to scan a two-dimensional array of transform coefficients to produce a one-dimensional array of transform coefficients for use in producing encoded video data. A video decoder, as another example, may use the function-based scan order, e.g., in an inverse manner, to scan a one-dimensional array of transform coefficients to reproduce a two-dimensional array of transform coefficients for use in producing decoded video data.

In each case, the scan order may vary according to the parameter values. In some examples, a video encoder may signal at least some of the parameter values in encoded video data generated by the video encoder. The video decoder may apply the parameter values to the function to define the scan order. In some examples, the parameter values may include transform unit size, scan orientation, and/or scan orientation strength.

In one example, the disclosure describes a method of coding video data, the method comprising defining a scan order for transform coefficients associated with a block of residual video data based at least in part on a predefined function and one or more parameter values for the function, and scanning the transform coefficients according to the scan order for use in a video coding process. In some examples, the method may be performed with a video encoder. In other examples, the video coding unit may be performed with a video decoder.

In another example, the disclosure describes an apparatus for coding video data, the apparatus comprising a video coding unit configured to define a scan order for transform coefficients associated with a block of residual video data based at least in part on a predefined function and one or more parameter values for the function, and scan the transform coefficients according to the scan order for use in a video coding process. In some examples, the video coder may be associated with a video encoder. In other examples, the video coder may be associated with a video decoder.

In another example, the disclosure describes a computer-readable medium comprising instructions to cause a video coder to define a scan order for transform coefficients associated with a block of residual video data based at least in part on a predefined function and one or more parameter values for the function, and scan the transform coefficients according to the scan order for use in a video coding process. In some examples, the video coder may be associated with a video encoder. In other examples, the video coder may be associated with a video decoder.

The details of one or more examples are set forth in the accompanying drawings and the description below. Other features, objects, and advantages will be apparent from the description and drawings, and from the claims.

BRIEF DESCRIPTION OF DRAWINGS

FIG. 9 is a diagram illustrating a scan order with a horizontal scan orientation.

FIG. 10 is a diagram illustrating a scan order with a lesser horizontal scan orientation strength than the scan order of FIG. 9.

FIG. 11 is a diagram illustrating an example of function-based scan order defined based on scan orientation and scan orientation strength parameters.

DETAILED DESCRIPTION

Figure 1:
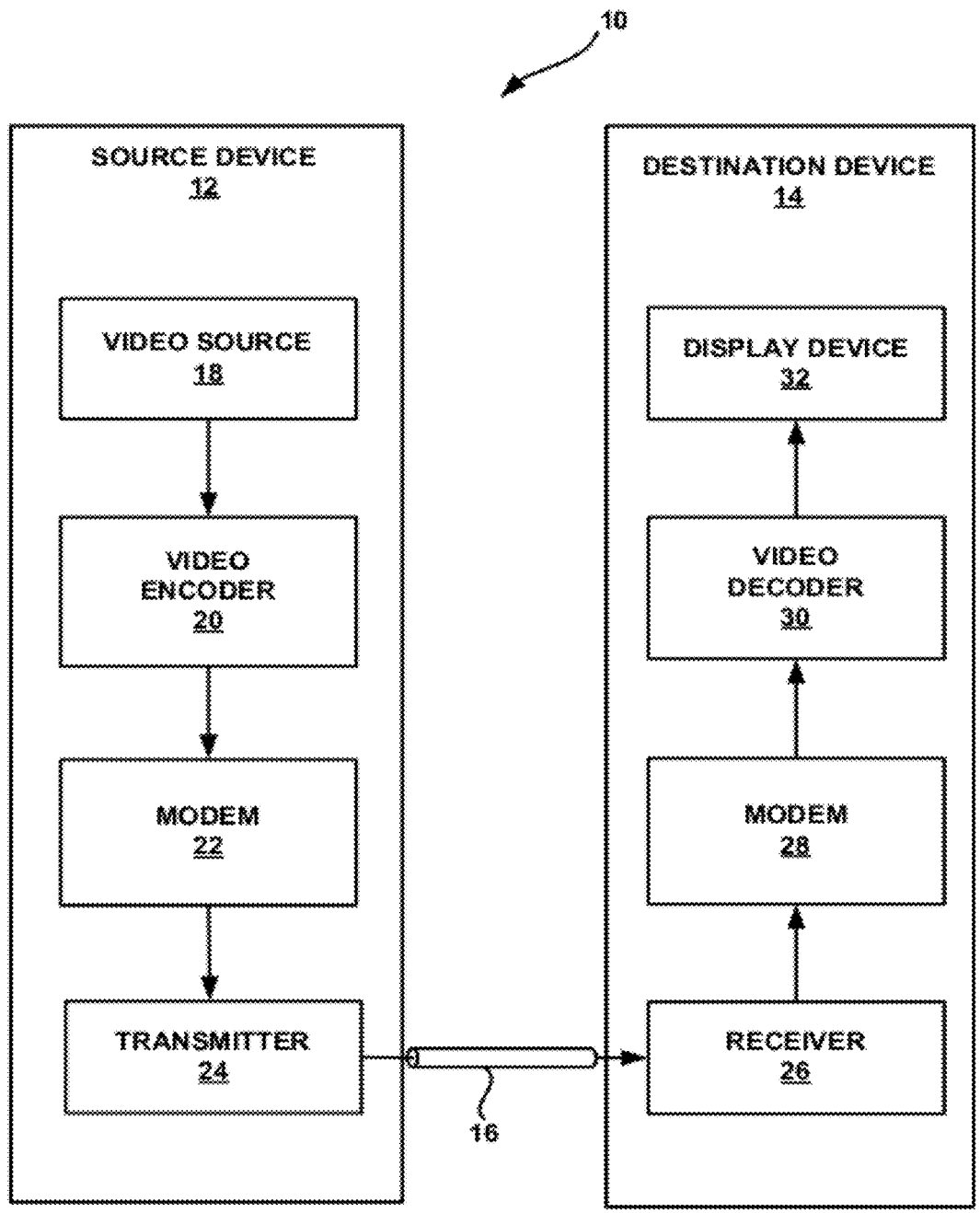
FIG. 1 is a block diagram illustrating an example video encoding and decoding system.

Digital video devices implement video compression techniques to transmit and receive digital video information more efficiently. Video compression may apply spatial (intra-frame) prediction and/or temporal (inter-frame) prediction techniques to reduce or remove redundancy inherent in video sequences. For video coding according to the high efficiency video coding (HEVC) standard currently under development by the Joint Cooperative Team for Video Coding (JCT-VC), as one example, a video frame may be partitioned into coding units.

A coding unit generally refers to an image region that serves as a basic unit to which various coding tools are applied for video compression. A coding unit is typically square, and may be considered to be similar to a so-called macroblock, e.g., under other video coding standards such as ITU-T H.264. Coding according to some of the presently proposed aspects of the developing HEVC standard will be described in this application for purposes of illustration. However, the techniques described in this disclosure may be useful for other video coding processes, such as those defined according to H.264 or other standard or proprietary video coding processes.

To achieve desirable coding efficiency, according to HEVC, a coding unit (CU) may have variable sizes depending on video content. In addition, a coding unit may be split into smaller blocks for prediction or transform. In particular, each coding unit may be further partitioned into prediction units (PUs) and transform units (TUs). Prediction units may be considered to be similar to so-called partitions under other video coding standards, such as the H.264 standard. A TU generally refers to a block of residual data to which a transform is applied to produce transform coefficients.

A coding unit usually has a luminance component, denoted as Y, and two chroma components, denoted as U and V. Depending on the video sampling format, the size of the U and V components, in terms of number of samples, may be the same as or different from the size of the Y component.

To code a block (e.g., a prediction unit (PU) of video data), a predictor for the block is first derived. The predictor, also referred to as a predictive block, can be derived either through intra (I) prediction (i.e., spatial prediction) or inter (P or B) prediction (i.e. temporal prediction). Hence, some prediction units may be intra-coded (I) using spatial prediction with respect to reference samples in neighboring reference blocks in the same frame, and other prediction units may be uni-directionally inter-coded (P) or bi-directionally inter-coded (B) with respect to blocks of reference samples in other frames. In each case, the reference samples may be used to form a predictive block for a block to be coded.

Upon identification of a predictive block, the difference between the original video data block and its predictive block is determined. This difference may be referred to as the residual data, and indicates the pixel differences between the pixel values in the block to the coded and the pixel values in the predictive block selected to represent the coded block. To achieve better compression, the residual data may be transformed, e.g., using a discrete cosine transform (DCT), an integer transform, a Karhunen-Loeve (K-L) transform, or another transform.

The residual data in a transform block, such as a TU, may be arranged in a two-dimensional (2D) array of pixel difference values residing in the spatial, pixel domain. A transform converts the residual pixel values into a two-dimensional array of transform coefficients in a transform domain, such as a frequency domain. For further compression, the transform coefficients may be quantized prior to entropy coding. An entropy coder then applies entropy coding, such as Context Adaptive Variable Length Coding (CAVLC), Context Adaptive Binary Arithmetic Coding (CABAC), or the like, to the quantized transform coefficients.

To entropy code a block of quantized transform coefficients, a scanning process is usually performed so that the two-dimensional (2D) array of quantized transform coefficients in a block is rearranged, according to a particular scan order, into an ordered, one-dimensional (1D) array, i.e., vector, of transform coefficients. Entropy coding is then applied to the vector of transform coefficients. The scan of the quantized transform coefficients in a transform unit serializes the 2D array of transform coefficients for the entropy coder. A significance map may be generated to indicate the positions of significant (i.e., non-zero) coefficients. In other examples, a significant map may not be generated. Scanning may be applied to scan levels of coefficients, such as levels of significant (i.e., nonzero) coefficients, and/or to code signs of the significant coefficients. Levels may refer to absolute values of the coefficients. Scanning of coefficients may refer to scanning coefficients to code coefficient significance, code coefficient levels, code coefficient signs, or code other pertinent coefficient information. In some examples, the scanning may support entropy coding of information such as coefficient levels, signs, zero run lengths between nonzero coefficients, or the like, e.g., according to CAVLC coding processes. Also, in some examples, the scanning may support entropy coding of transform coefficient information such as significance information for a significance map, coefficient levels, coefficient signs, or the like, e.g., according to CABAC coding processes. Accordingly, scan orders generated according to techniques described in this disclosure may be applied to support coding of transform coefficient information according to different types of entropy coding techniques, such as CAVLC or CABAC processes.

For a DCT, as an example, there is often a higher probability of non-zero coefficients toward an upper left corner (i.e., a low frequency region) of the 2D transform unit. It may be desirable to scan the coefficients in a way that increases the probability of grouping non-zero coefficients together at the beginning of the serialized run of coefficients, permitting zero-valued coefficients to be grouped together toward the end of the serialized vector and more efficiently coded as runs of zeros. For this reason, scan order may be important for efficient entropy coding.

As one example, the so-called "zigzag" scan order has been widely used for scanning quantized transform coefficients. Alternatively, horizontal, vertical or other scan orders may be used. In some cases, scan orders that combine aspects of zig-zag, horizontal, and/or vertical scan orders may be used. Other scan orders such as diagonal scan orders may also be used. Through transform and quantization, as mentioned above, non-zero transform coefficients are generally located at the low frequency area toward the upper left region of the block, e.g., for an example in which the transform is a DCT. As a result, after the zigzag scanning process, which may traverse the upper left region first, non-zero transform coefficients are usually more likely to be located in the front portion of the 1D array.

A number of zero coefficients usually trail at the end of the 1D array, due to reduced energy at higher frequencies, and due to the effects of quantization, which may cause some nonzero coefficients to become zero-valued coefficients upon reduction of bit depth. These characteristics of coefficient distribution in the serialized 1D array may be utilized in entropy coder design to improve coding efficiency. In other words, if non-zero coefficients can be effectively arranged in a front portion of the 1D array through some appropriate scan order, better coding efficiency can be expected due to the design of many entropy coders. For example, entropy coding may code runs of zero-valued coefficients, providing more efficient symbols for coding.

To achieve this objective of placing more non-zero coefficients at the front section of the 1D array, different scan orders may be used in a video encoder-decoder (CODEC) to code transform coefficients. In some cases, zig-zag scanning may be effective. In other cases, different types of scanning, such as vertical scanning or horizontal scanning, may be more effective in placing non-zero coefficients at a front section of the 1D array.

Different scan orders may be produced in a variety of ways. One example is that, for each block of transform coefficients, a "best" scan order may be chosen from a number of available scan orders. A video encoder then may signal to the encoder, for each block, an index of the best scan order among a set of scan orders denoted by respective indices and stored at the decoder. The selection of the best scan order may be determined by applying several scan orders and selecting one that is most effective in placing nonzero coefficients near the beginning of the 1D vector, thereby promoting efficient entropy coding.

In another example, the scan order for a current block may be determined based on various factors relating to the coding of the pertinent prediction unit, such as the prediction mode (I, B, P), or other factors. In this case, because the same information, e.g., prediction mode, can be inferred or otherwise determined at both the encoder and decoder side, there may be no need to signal the scan order index from the encoder to the decoder. Instead, the video decoder may know the appropriate scan order given knowledge of the prediction mode for a block, and one or more criteria that maps a prediction mode to a particular scan order.

To further improve coding efficiency, the available scan orders may not be constant all of the time. Instead, some adaptation might be enabled so that the scan order is adaptively adjusted, e.g., based on coefficients that are already coded. In general, the scan order adaptation may be done in such a way that, according to the selected scan order, a coefficient position that is more likely to have a non-zero value is scanned before a position that is less likely to have non-zero coefficients.

In some video CODECs, the initial scan orders that are available for use may be in a very regular form such as purely horizontal, vertical or zigzag scan. Alternatively, the scan orders may be derived through a training process and therefore may appear to be somewhat random. The training process may involve application of different scan orders to a block or series of blocks to identify a scan order that produces desirable results, e.g., in terms of efficient placement of non-zero and zero-valued coefficients, as mentioned above.

If a scan order is derived from a training process, or if a scan order does not have a regular pattern in terms of order arrangement, it may be necessary to save the particular scan orders at both the encoder and decoder side. Unfortunately, in some cases, the amount of data specifying such scan orders can be substantial. For example, for a 32×32 transform block, one scan order may contain 1024 transform coefficient positions. Because there may be differently sized blocks and, for each size of transform block, there may be a number of different scan orders, the total amount of data that needs to be saved is not negligible. Regular scan orders such as horizontal, vertical or zigzag order may not require storage, or may require minimal storage. However, horizontal, vertical or zigzag orders may not provide sufficient variety to provide coding performance that is on par with trained scan orders.

According to examples of this disclosure, a scan order for scanning transform coefficients in a block of transform coefficients may be efficiently defined using a function. A single function may be used to produce different scan orders based on different function parameter values. Alternatively, multiple functions may be used to produce different scan orders, e.g., with the same or different parameters or parameter values. Hence, different scan orders may be produced by selecting different parameter values, different functions, or combinations of both. In this way, complex scan orders can be defined, e.g., in a way that reduces the amount of stored data needed at the encoder and decoder to define such complex scan orders.

The use of a function-based definition of scan order, in some examples, may permit a variety of scan orders to be produced without the need to store the scan orders in memory at the encoder and/or decoder. For example, a function may be applied at the encoder and/or decoder to generate a scan order for a given block or group of blocks. The use of different parameter values allows the encoder and/or decoder to adjust the scan order in a more flexible manner, relative to simple scan orders such as zigzag, horizontal and vertical scan orders. Yet, with the use of a function to define scan order, the encoder and/or decoder may store substantially less data than typically would be required to directly represent a number of different scan orders.

A video coder, such as a video encoder or a video decoder, may define a scan order for transform coefficients based at least in part on a predefined function and one or more parameter values for the function. A video encoder, for example, may use a function-based scan order to scan a two-dimensional array of transform coefficients to produce a one-dimensional array of transform coefficients for use in producing encoded video data. A video decoder, as another example, may use the function-based scan order, in an inverse manner, to scan a one-dimensional array of transform coefficients to reproduce the two-dimensional array of transform coefficients for use in producing decoded video data. The transform coefficients may be expressed as levels, i.e., absolute values, of the transform coefficients. The scan order may be used in coding a significance map of significant coefficients, coding levels of significant coefficients, and/or coding signs of significant coefficients, and/or other pertinent transform information, e.g., for CABAC processes. In other examples, the scan order may be used in coding levels of coefficients, coding signs of significant coefficients, coding zero run lengths between nonzero coefficients, and/or other pertinent transform information, e.g., for CAVLC processes. Hence, scanning the transform coefficients according to the scan order may comprise, in various examples, coding at least one of significance (i.e., status of coefficient as nonzero or zero-valued coefficient), levels, signs, or zero run lengths for transform coefficients associated with a block of residual video data (e.g., transform coefficients in a TU) according to the scan order The scan order defined by a video coder, i.e., a video encoder or video decoder, may vary according to the parameter values. In some examples, the parameter values may include transform unit size, i.e., block size, scan orientation, and/or scan orientation strength. A video encoder may signal the parameter values to the video decoder, either explicitly or by index values that point to different parameter values stored by the decoder. In some examples, the video encoder may signal a particular function among a plurality of available functions, e.g., by an index value. Hence, the video encoder and video decoder may use a single function or multiple functions. In each case, different sets of parameter values may be applied as inputs to a function to produce a scan order.

This disclosure generally describes the use of a single function with different parameter values, for purposes of illustration. However, the techniques described in this disclosure may be generally applicable to the use of single functions or multiple functions, with different sets of parameter values, to define a scan order at the video encoder and/or the video decoder. In addition, the disclosure describes function-based definition of scan order generally, but also in reference to some aspects of the developing HEVC standard. Although the HEVC standard is described for purposes of illustration, the techniques described in this disclosure may be generally applicable to any video coding process in which scanning of transform coefficients is desirable.

FIG. 1 is a block diagram illustrating an example video encoding and decoding system 10 that utilizes techniques for function-based definition of scan order to scan transform coefficients associated with blocks of residual video data. As shown in FIG. 1, system 10 includes a source device 12 that transmits encoded video to a destination device 14 via a communication channel 16. Source device 12 and destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, communication channel 16 may comprise a wireless channel, a wired channel, or a combination of wireless and wired channels suitable for transmission of encoded video data.

Techniques for function-based definition of scan order to scan transform coefficients, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-video transmission to support applications such as video streaming, video playback, video broadcasting, and/or video telephony.

In the example of FIG. 1, source device 12 includes a video source 18, video encoder 20, a modulator/demodulator 22 and a transmitter 24. In source device 12, video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications, or to access to local media storing encoded video data.

The captured, pre-captured, or computer-generated video may be encoded by video encoder 20. The encoded video information may be modulated by modem 22 according to a communication standard, such as a wireless communication protocol, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Destination device 14, in the example of FIG. 1, includes a receiver 26, a modem 28, a video decoder 30, and a display device 32. Receiver 26 of destination device 14 receives information over channel 16, and modem 28 demodulates the information to produce a demodulated bitstream for video decoder 30. The information communicated over channel 16 may include a variety of syntax information generated by video encoder 20 for used by video decoder 30 in decoding video data. Each of video encoder 20 and video decoder 30 may form part of a respective encoder-decoder (CODEC) that is capable of encoding or decoding video data.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video encoder 20 may implement any or all of the techniques of this disclosure to improve encoding of transform units of a coding unit. Likewise, video decoder 30 may implement any or all of these techniques to improve decoding of transform units of a coding unit. In general, the techniques of this disclosure relate to devices and methods for video coding using a function-based definition of scan order to scan transform coefficients associated with a block of residual video data.

A video coder, as described in this disclosure, may refer to a video encoder or a video decoder. Hence, video encoder 20 and video decoder 30 each may be referred to, generally, as a video coder. Likewise, video coding may refer to video encoding or video decoding. The terms coder, encoder and decoder refer to specific machines configured for the coding (e.g., encoding, decoding or both) of video data. In general, a function for defining a scan order may be an algorithm, process, equation, sequence, or formula that produces a particular scan order for a given set of one or more parameter values applied as inputs to the function. A scan order may refer to an order in which an encoder scans a two-dimensional array of transform coefficients in a transform unit to produce a one-dimensional array of transform coefficients (e.g., to code information associated with such transform coefficients such as level and/or sign) or an order in which a decoder scans a one-dimensional array of transform coefficients into a two-dimensional array of transform coefficients. The two-dimensional array of transform coefficients may reside in a transform domain. The one-dimensional array of transform coefficients may be a serialized representation of the two-dimensional array of transform coefficients. In each case, the scanned coefficients may be quantized or unquantized transform coefficients.

A video encoder may apply the scan order to scan transform coefficients from the two-dimensional array to the one-dimensional array, whereas a video decoder may apply the scan order, e.g., in an inverse manner to the encoder, to scan transform coefficients from the one-dimensional array to the two-dimensional array. Alternatively, a video decoder may apply the scan order to scan transform coefficients from the one-dimensional array to the two-dimensional array, and a video encoder may apply the scan order, in an inverse manner to the decoder, to scan transform coefficients from the two-dimensional array to the one-dimensional array. Hence, scanning by a coder may refer to 2D-to-1D scanning by an encoder or 1D-to-2D scanning by a decoder. In addition, scanning according to a scan order may refer to scanning in the scan order for 2D-to-1D scanning, scanning in the scan order for 1D-to-2D scanning, scanning in the inverse of the scan order for 1D-to-2D scanning, or scanning in the inverse of the scan order for 2D-to-1D scanning. Hence, the scan order may be established for scanning by the encoder or scanning by the decoder.

In the example of HEVC coding, video encoder 20 may receive a largest coding unit (LCU) and determine whether to split the LCU into four quadrants, each comprising a sub-CU, or whether to encode the LCU without splitting. Following a decision to split an LCU into sub-CUs, video encoder 20 may determine whether to split each sub-CU into four quadrants, each comprising a sub-CU. Video encoder 20 may continue to recursively determine whether to split a CU, with a maximum number of splits indicated by the LCU depth. Video encoder 20 may provide a quadtree data structure indicative of the splitting of an LCU and sub-CUs of the LCU. The LCU may correspond to a root node of the quadtree. Each node of the quadtree may correspond to a CU of the LCU. Moreover, each node may include a split flag value indicative of whether the corresponding CU is split.

If the LCU is split, for example, video encoder 20 may set the value of the split flag in the root node to indicate that the LCU is split. Then, video encoder 20 may set values of child nodes of the root node to indicate which, if any, of the sub-CUs of the LCU are split. A CU that is not split may correspond to a leaf node of the quadtree data structure, where a leaf node has no child nodes. For each CU corresponding to a leaf node, video encoder 20 may determine whether to form one PU having the same size as the CU, or to form four PUs representing portions of the CU. For each PU, a prediction block may be formed with prediction data retrieved from neighboring, previously coded CUs, according to an intra-prediction mode, or from a predictive block in a previously coded reference frame, according to an inter-prediction mode.

In each case, following intra-predictive or inter-predictive coding to produce prediction values for a PU of a CU, video encoder 20 may calculate residual data to produce one or more transform units (TUs) for the CU. The residual data may correspond to pixel differences between pixels of the PU to be coded and prediction values for the PU. Video encoder 20 may form one or more TUs including the residual data for the CU. Video encoder 20 may then transform the TUs, e.g., using a discrete cosine transform (DCT), an integer transform, a Karhunen-Loeve (K-L) transform, or another transform. In some examples, video encoder 20 may be configured to apply more than one transform to a TU, e.g., in a cascaded manner.

By transforming residual data for a TU, video encoder 20 produces a two-dimensional array of transform coefficients. The two-dimensional array generally has the same size as the input block to the transform, i.e., the TU. In general, the transform process prepares the residual data for quantization, which further compresses the data. Quantization generally refers to a process in which transform coefficients are quantized to possibly reduce the amount of data used to represent the coefficients. The quantization process may reduce the bit depth associated with some or all of the coefficients in the TU. For example, an n-bit value may be rounded down to an m-bit value during quantization, where n is greater than m.

Video encoder 20 may apply a predefined scan order, or generate a particular scan order, to scan the quantized transform coefficients and thereby produce a serialized vector of the transform coefficients for entropy encoding. In some examples, video encoder 20 may select different scan orders based on one or more criteria for a particular block. For example, video encoder 20 may select different scan orders based on different coding modes for a particular block, e.g., generally I, P, or B modes or particular modes of I, P or B, or based on different types of transforms, different TU sizes, or other criteria. Additionally, or alternatively, the scan order may be defined based on empirical testing of scans, e.g., to optimize the placement of transform coefficients in the vector such that higher energy coefficients, i.e., nonzero coefficients, are compacted toward the front of the serialized vector of transform coefficients.

In some examples, video encoder 20 may empirically test different scans evaluate various function-based scan orders, and select a scan order that produces a desired placement of transform coefficients. For example, video encoder 20 may adjust one or more parameter values for the function to produce different scan orders, and evaluate the results of the scan orders, e.g., in terms of efficient compaction of nonzero transform coefficients toward the front of the 1D vector. Video encoder 20 may test a range of parameter values according to any of a variety of predetermined testing schemes. If the function has multiple parameter values, the testing may evaluate one-dimensional changes (e.g., changing a value one parameter while holding others fixed) to the parameters or multi-dimensional changes to the parameters (e.g., changing values of multiple parameters at once).

A function for defining scan order may be configured to be responsive to a single parameter value as an input, or multiple parameter values. In some examples, the function may be configured to define different scan orders based on different block sizes (e.g., TU sizes), scan orientations and/or scan orientation strengths. Scan orientation may designate whether a scan is mainly oriented horizontally or vertically, or in another direction, in terms of scanning across rows or columns of a block of transform coefficients in a TU. Scan orientation strength may indicate the strength of the orientation of the scan order, e.g., as a degree to which the scan order is biased toward the scan orientation.

For example, a scan order with a very strong horizontal orientation might scan all coefficients in a row before proceeding to scanning coefficients in the next row. A scan order with a weaker horizontal orientation might scan a subset of the coefficients in a first row and then proceed to scan a subset of coefficients in one or more other rows before returning to scan the remaining coefficients in the first row. In some cases, the scan order could return to the first row multiple times to scan several subsets of the remaining coefficients on an alternating basis with subsets of coefficients in other rows.

According to examples of this disclosure, video encoder 20 and video decoder 30 may efficiently define a scan order for scanning transform coefficients in a block of transform coefficients based on a function. Again, video encoder 20 and video decoder 30 may make use of a single function to produce different scan orders with different function parameter values. Alternatively, or additionally, video encoder 20 and video decoder 30 may use multiple functions to produce different scan orders, e.g., with the same parameter values or different parameter values. Hence, in these examples, different scan orders may be produced by selecting different parameter values, different functions, or combinations of both.

In some examples, video encoder 20 may specify values of one or more function parameters for a given function to define the scan order according to the function, and then signal at least some of the one or more parameter values to video decoder 30. As mentioned above, the values of the parameters signaled to video decoder 30 could be selected by video encoder 20 based on evaluation of different sets of parameters and selection of the parameters that yield the best, or at least satisfactory, results in terms of efficient compaction of nonzero coefficients near the start of the serialized vector.

It should be noted that signaling, as described in this disclosure, does not necessarily refer to an interactive, real-time communication between a device incorporating video encoder 20 and a device incorporating video decoder 30. Rather, the signaling may be presented in an encoded video bitstream. The encoded video bitstream may be transmitted to a destination device incorporating video decoder 30 from a source device incorporating video encoder 20. In many cases, alternatively, the encoded video bitstream may simply be recorded in a data storage archive, e.g., on a disk or server, and retrieved by a device that accesses data on, or makes a request for data from, the data storage archive. For example, the encoded video may be transmitted to, or stored on a local storage device accessed by, video decoder 30, e.g., in a computer, media player, smartphone, or the like.

The function may be a single function defined by instructions stored at both video encoder 20 and video decoder 30. In this case, video encoder 20 may signal at least some of the one or more parameter values to video decoder 30. Alternatively, the function may be one of a plurality of functions defined by instructions stored at video encoder 20 and video decoder 30. In this case, video encoder 20 may signal the identity of the selected function and at least some of the one or more parameter values for the function in the encoded video received or accessed by video decoder 30. This signaling could be transmitted in the bitstream, for example, for individual TU's, PU's or CU's, such that different scan orders may be specified for individual TU's or for multiple TU's within a CU. However, the ability to specify particular scan orders for individual TU's may be desirable in some applications.

Video encoder 20 may signal functions and/or parameter values, as applicable, either explicitly or by reference to index values that identify the functions or parameter values. Video encoder 20 may signal one or more indices for the parameter values, e.g., individually or for a set of parameter values, stored by video decoder 30, and/or a particular function defined by instructions or data stored by the video decoder. In some examples, video encoder 20 may also signal particular characteristics of a function, e.g., using a table of values to define the function, along with parameter values.

In some cases, video decoder 30 may be configured to infer one or more parameters for the function. As an example, video decoder 30 may determine a TU size from syntax elements transmitted by video encoder 20, and select a function or one or more parameter values for the function based on the TU size. In some examples, some parameter values may be inferred and some parameter values may be signaled by syntax elements in the encoded bitstream. In other examples, all parameter values for the scan order function may be signaled by video encoder 20. Functions and/or parameter values may be signaled, for example, as syntax elements at various levels of the video data, such as sequence level, picture level, slice level, coding unit level (including both LCU and CU level), TU level or other coding levels. To permit definition of different scan orders for different TU's, it may be desirable to signal such syntax elements at the TU level, e.g., in a TU quadtree header.

Video encoder 20 may signal the parameter values in the encoded video bitstream. Video decoder 20, upon receiving or otherwise accessing the encoded video bitstream, then may apply the signaled parameter values to a known function to construct the scan order according to the function. The function may be defined by instructions or data stored in memory associated with video decoder 20. In other examples, a function or set of functions may be known to both video encoder 20 and video decoder 30, and the parameter values may be inferred at both the encoder and decoder side, e.g., based on the characteristics of a transform unit, such as block size. In this case, video encoder 20 and video decoder 30 both may store parameter values and/or functions for use in function-based definition of scan order. Consequently, in some examples, video encoder 20 may not need to signal parameter values or functions.

In each of the above examples, constructing scan orders at video encoder 20 and/or video decoder 30 using a function may provide the capability of generating sophisticated and flexible scan orders without the need for saving the exact scan order position by position at the encoder and decoder, which would otherwise require a large amount of data storage. Instead of retrieving an extensive scan order definition from memory, for example, video decoder 30 can construct the scan order using a function and parameter values that are either signaled by video encoder 20 or inferred by the decoder. Storing instructions or data for a function used to define scan orders based on one or more parameter values may consume significantly less memory in video decoder 30 than storing a plurality of actual scan orders.

A function with one or more particular parameters may be used to generate the transform coefficient scan orders. In one example, as mentioned above, the function parameters may include one or more of transform unit size, scan orientation and scan orientation strength. These parameters may be used individually or in combination to define the scan order used by video encoder 20 and video decoder 30. Given values for these parameters, a scan can be generated by video encoder 20 and video decoder 30 using the function. For a certain size of transform block, multiple scan orders can be generated at video encoder 20 using the function with different parameter values, e.g., by providing different scan orientations and orientation strengths. Video encoder 20 may select one of the scan orders that delivers desired results, and then signal to video decoder 30 the pertinent parameter values used to generate the scan order.

As noted above, in some examples, the same function may be available to both the encoder and the decoder. As a result, as long as the same function parameter values are known to both the video encoder and video decoder, the same scan orders can be generated at both the encoder and decoder sides.

After applying the selected scan order to scan a two-dimensional matrix of transform coefficients for a transform unit into a one-dimensional vector, video encoder 20 may entropy encode the one-dimensional vector, e.g., using content adaptive variable length coding (CAVLC), context adaptive binary arithmetic coding (CABAC), syntax-based context-adaptive binary arithmetic coding (SBAC), or other entropy coding processes. Selection of a scan order that is effective in placing nonzero coefficients in toward the start of the vector can help improved coding efficiency, given the design of a particular entropy encoder.

To perform CAVLC, as one example, video encoder 20 may select a variable length code for a symbol to be transmitted. Codewords in VLC may be constructed such that relatively shorter codes correspond to more likely symbols, while longer codes correspond to less likely symbols. In this way, the use of VLC may achieve a bit savings over, for example, using equal-length codewords for each symbol to be transmitted.

As another example, to perform CABAC, video encoder 20 may select a context model to apply to a certain context to encode symbols to be transmitted. The context may relate to, for example, whether neighboring values are non-zero or not. Video encoder 20 may also entropy encode syntax elements, such as a significant coefficient flag and a last coefficient flag produced when performing an adaptive scan.

Video decoder 30 may operate in a manner essentially symmetrical to that of video encoder 20. For example, video decoder 30 may receive entropy encoded data representative of an encoded CU, including encoded PU and TU data. Video decoder 30 may entropy decode the received data, forming decoded quantized coefficients. When video encoder 20 entropy encodes data, e.g., using a variable length code algorithm, video decoder 30 may use one or more VLC tables to determine a symbol corresponding to a received codeword. When video encoder 20 entropy encodes data using an arithmetic coding algorithm, video decoder 30 may use a context model to decode the data, which may correspond to the same context model used by video encoder 20 to encode the data.

Video decoder 30 may then inverse scan the decoded coefficients, using an inverse scan that mirrors the scan used by video encoder 20. To inverse scan the coefficients, video decoder 30 may generate the scan order according to the function used by video encoder 20, which may be defined by instructions or data stored at the decoder or signaled by the encoder, and according to one or more parameter values specified for the function. In particular, video decoder 30 may receive signaling of one or more parameter values from video encoder 20 for use with the function, and/or infer one or more parameter values, and generate the scan order based on the parameter values. Using this scan order, video decoder 30 thereby forms a two-dimensional matrix from the one-dimensional vector of quantized transform coefficients resulting from the entropy decoding process.

Next, video decoder 30 may inverse quantize the coefficients in the two-dimensional matrix produced by the inverse scan performed according to the function-based scan order. Video decoder 30 may then apply one or more inverse transforms to the two-dimensional matrix. The inverse transforms may correspond to the transforms applied by video encoder 20. Video decoder 30 may determine the inverse transforms to apply based on, for example, information signaled at the root of a quadtree corresponding to the CU currently being decoded, or by reference to other information indicative of the appropriate inverse transforms. Upon application of the inverse transform(s), video decoder 30 recovers the residual video data in the pixel domain and applies intra-predictive or inter-predictive decoding, as applicable, to reconstruct the original video data.

Figure 2:
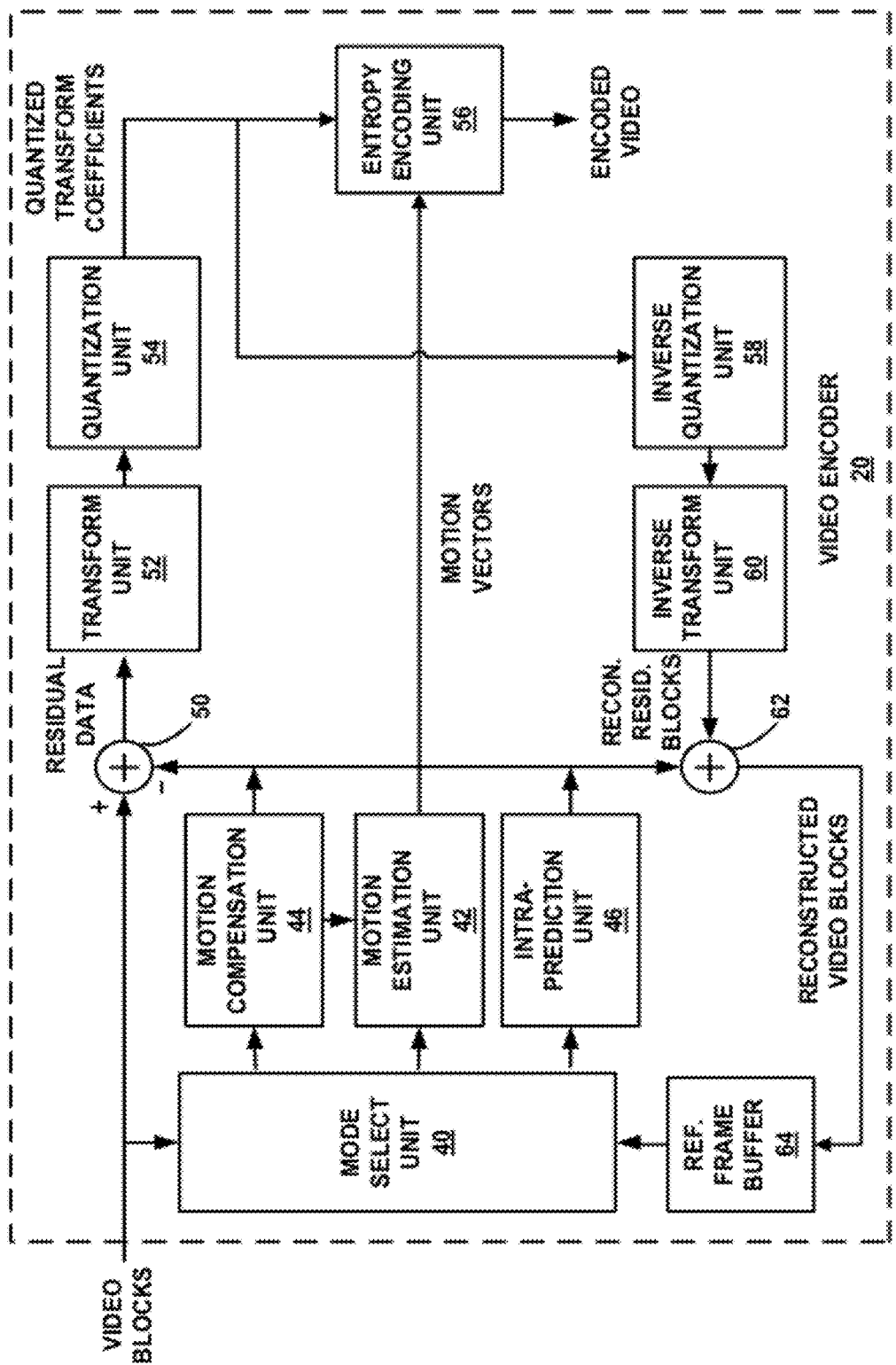
FIG. 2 is a block diagram illustrating an example of a video encoder that may use techniques for function-based definition of scan order for transform coefficients.

FIG. 2 is a block diagram illustrating an example of video encoder 20 that may use techniques for function-based definition of scan order for transform coefficients as described in this disclosure. Video encoder 20 will be described in the context of HEVC coding for purposes of illustration, but without limitation of this disclosure as to other coding standards or methods that may require scanning of transform coefficients. Video encoder 20 may perform intra- and inter-coding of CUs within video frames. Intra-coding relies on spatial prediction to reduce or remove spatial redundancy in video within a given video frame. Inter-coding relies on temporal prediction to reduce or remove temporal redundancy between a current frame and previously coded frames of a video sequence. Intra-mode (I-mode) may refer to any of several spatial-based video compression modes. Inter-modes such as uni-directional prediction (P-mode) or bi-directional prediction (B-mode) may refer to any of several temporal-based video compression modes.

As shown in FIG. 2, video encoder 20 receives a current video block within a video frame to be encoded. In the example of FIG. 2, video encoder 20 includes motion compensation unit 44, motion estimation unit 42, intra-prediction unit 46, reference frame buffer 64, summer 50, transform unit 52, quantization unit 54, and entropy encoding unit 56. Entropy encoding unit 56 refers to part of video encoder 20 that applies entropy coding, and should not be confused with a CU. Likewise, transform unit 52 illustrated in FIG. 2 is the unit that applies the actual transform to a block of residual data, and is not to be confused with block of transform coefficients, which also may be referred to as a transform unit (TU) of a CU. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62.

During the encoding process, video encoder 20 receives a video frame or slice to be coded. The frame or slice may be divided into multiple video blocks, e.g., largest coding units (LCUs). Motion estimation unit 42 and motion compensation unit 44 perform inter-predictive coding of the received video block relative to one or more blocks in one or more reference frames to provide temporal compression. Intra-prediction unit 46 may perform intra-predictive coding of the received video block relative to one or more neighboring blocks in the same frame or slice as the block to be coded to provide spatial compression.

Mode select unit 40 may select one of the coding modes, intra or inter, e.g., based on error (i.e., distortion) results for each mode, and provides the resulting intra- or inter-coded block to summer 50 to generate residual block data and to summer 62 to reconstruct the encoded block for use in a reference frame. Some video frames may be designated as I-frames, where all blocks in an I-frame are encoded in an intra-prediction mode. In some cases, intra-prediction unit 46 may perform intra-prediction encoding of a block in a P- or B-frame, e.g., when a motion search performed by motion estimation unit 42 does not result in a sufficiently good prediction of the block.

Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a prediction unit in a current frame relative to a reference sample of a reference frame. A reference sample may be a block that is found to closely match the portion of the CU including the PU being coded in terms of pixel difference, which may be determined by sum of absolute difference (SAD), sum of square difference (SSD), or other difference metrics. Motion compensation, performed by motion compensation unit 44, may involve fetching or generating values for the prediction unit based on the motion vector determined by motion estimation. Again, motion estimation unit 42 and motion compensation unit 44 may be functionally integrated, in some examples.

Motion estimation unit 42 calculates a motion vector for a prediction unit of an inter-coded frame by comparing the prediction unit to reference samples of a reference frame stored in reference frame buffer 64. In some examples, video encoder 20 may calculate values for sub-integer pixel positions of reference frames stored in reference frame buffer 64. For example, video encoder 20 may calculate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision. Motion estimation unit 42 sends the calculated motion vector to entropy encoding unit 56 and motion compensation unit 44. The portion of the reference frame identified by a motion vector may be referred to as a reference block of pixel data. Motion compensation unit 44 may calculate a prediction block for a prediction unit of a current CU, e.g., by retrieving the reference block identified by a motion vector for the PU.

Intra-prediction unit 46 may intra-prediction encode the received block, as an alternative to inter-prediction performed by motion estimation unit 42 and motion compensation unit 44. Intra-prediction unit 46 may encode the received block relative to neighboring, previously coded blocks, e.g., blocks above, above and to the right, above and to the left, or to the left of the current block, assuming a left-to-right, top-to-bottom encoding order for blocks. Intra-prediction unit 46 may be configured with a variety of different intra-prediction modes. For example, intra-prediction unit 46 may be configured with a certain number of directional prediction modes, e.g., 33 directional prediction modes, based on the size of the CU being encoded.

Intra-prediction unit 46 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, intra-prediction unit 46 may calculate an error value for the prediction mode based on pixel differences between the PU and the received block to be encoded. Intra-prediction unit 46 may continue testing intra-prediction modes until an intra-prediction mode that yields an acceptable or smallest error value is discovered. Intra-prediction unit 46 may then send the prediction block of the PU to summer 50.

Video encoder 20 forms a residual block by subtracting the prediction data calculated by motion compensation unit 44 or intra-prediction unit 46 from the original video block being coded. Summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the prediction block of the PU and in the original block to be coded. The differences may be chroma or luma differences depending on the type of block that is coded.

Transform unit 52 may form one or more transform units (TUs) from the residual block. Transform unit 52 applies a transform, such as a discrete cosine transform (DCT), a directional transform, or a conceptually similar transform, to the TU, producing a video block comprising transform coefficients. Transform unit 52 may send the resulting transform coefficients to quantization unit 54. Quantization unit 54 may then quantize the transform coefficients. Entropy encoding unit 56 may then perform a scan of the quantized transform coefficients in the matrix according to a specified scan order. This disclosure describes entropy encoding unit 56 as performing the scan. However, it should be understood that, in other examples, other processing units, such as quantization unit 54, could perform the scan.

Video encoder 20, via entropy encoding unit 56 or another functional unit such as quantization unit 54, may generate a plurality of different scan orders by applying different sets of parameters to a given function that defines the scan order, and/or by applying different set of parameters to different functions. For example, video encoder 20 may make use of a single function or a set of functions to generate different scan orders. Different functions may receive the same parameters or different parameters, depending on the configuration of the function. Video encoder 20 may apply different functions or different parameter values to produce different scan orders, and then evaluate the results of the scan orders, e.g., in terms of compacting higher energy coefficients toward the front of the 1D array resulting from the scan.

Video encoder 20, e.g., via entropy encoding unit 56, may then select one of the scan orders that produces the best results, or at least satisfactory results relative to some criteria, and apply the scan order to produce the 1D array for entropy encoding. Entropy encoding unit 56 then entropy encodes the 1D array of transform coefficients to produce an entropy coded bitstream. Video encoder 20 may transmit, in the bitstream, one or more syntax elements to signal the parameter values used for the scan order function and, in some cases, the identity of the function if multiple functions were possible. In this manner, by receiving the signaling from video encoder 20, video decoder 30 is able to determine the parameter values and/or function used by the video encoder and thereby reproduce the scan order. As will be described, video decoder 30 then may apply the scan order, in an inverse manner, to convert the 1D array of transform coefficients into a 2D array of transform coefficients. Again, the coefficients may be quantized by quantization unit 54 or, in alternate examples, unquantized.

In some examples, entropy encoding unit 56 may be configured to select values of one or more parameters of the scan order function based on statistics of previously coded TU's. For example, the statistics may indicate probabilities that transform coefficients at a particular position will be non-zero. In some examples, the statistics may be based on TU size or shape, number or arrangement of significant coefficients in other TUs (e.g., of same size and shape), levels of coefficients or numbers of significant coefficients in other TU's (e.g., of same size and shape), or other information. Using such probabilities, entropy encoding unit 56 may select one or more parameters for the scan order function, e.g., as a starting point, and then test other parameter values to identify a scan order that produces desirable results, e.g., in terms of placing non-zero coefficients toward the front of the scan. Entropy encoding unit 56 may determine the probabilities over time using various statistics and calculations. Moreover, entropy encoding unit 56 may track separate statistics for different prediction modes and/or transforms.

Once the transform coefficients are scanned, entropy encoding unit 56 may apply entropy coding such as CAVLC or CABAC to the coefficients. In addition, entropy encoding unit 56 may encode motion vector (MV) information and any of a variety of syntax elements useful in decoding the video data at video decoder 30. In some examples, the syntax elements may include a significance map with significant coefficient flags that indicate whether particular coefficients are significant (e.g., non-zero), a last significant coefficient flag that indicates whether a particular coefficient is the last significant coefficient, and/or other information. In other examples, the syntax elements may include zero run length information, coefficient level information, the last significant coefficient position, and/or other information. Video decoder 30 may use these syntax elements to reconstruct the encoded video data. Following the entropy coding by entropy encoding unit 56, the resulting encoded video may be transmitted to another device, such as video decoder 30, or archived for later transmission or retrieval.

To entropy encode the syntax elements, entropy encoding unit 56 may perform CABAC and select context models based on, for example, the number of significant coefficients in the previously scanned N coefficients, where N is an integer value that may be related to the size of the block being scanned. Entropy encoding unit 56 may also select the context model based on a prediction mode used to calculate residual data that was transformed into the block of transform coefficients, and a type of transform used to transform the residual data into the block of transform coefficients. When the corresponding prediction unit (PU) was predicted using an intra-prediction mode, entropy encoding unit 56 may further base the selection of the context model on the direction of the intra-prediction mode.

In some examples, transform unit 52 may be configured to zero out certain transform coefficients (that is, transform coefficients in certain locations). For example, transform unit 52 may be configured to zero out all transform coefficients outside of the upper-left quadrant of the TU following the transform. As another example, entropy encoding unit 56 may be configured to zero out transform coefficients in the array following a certain position in the array. In any case, video encoder 20 may be configured to zero out a certain portion of the transform coefficients, e.g., before or after the scan. The phrase "zero out" is used to mean setting the value of the coefficient equal to zero, but not necessarily skipping or discarding the coefficient. In some examples, this setting of coefficients to zero may be in addition to the zeroing out that may result from quantization.

In some cases, entropy encoding unit 56 or another unit of video encoder 20 may be configured to perform other coding functions, in addition to entropy coding. For example, entropy encoding unit 56 may be configured to determine coded block pattern (CBP) values for CU's and PU's. Also, in some cases, entropy encoding unit 56 may perform run length coding of coefficients.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame buffer 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame buffer 64. The reconstructed video block may be used by motion estimation unit 42 and motion compensation unit 44 as a reference block to inter-code a block in a subsequent video frame.

Figure 3:
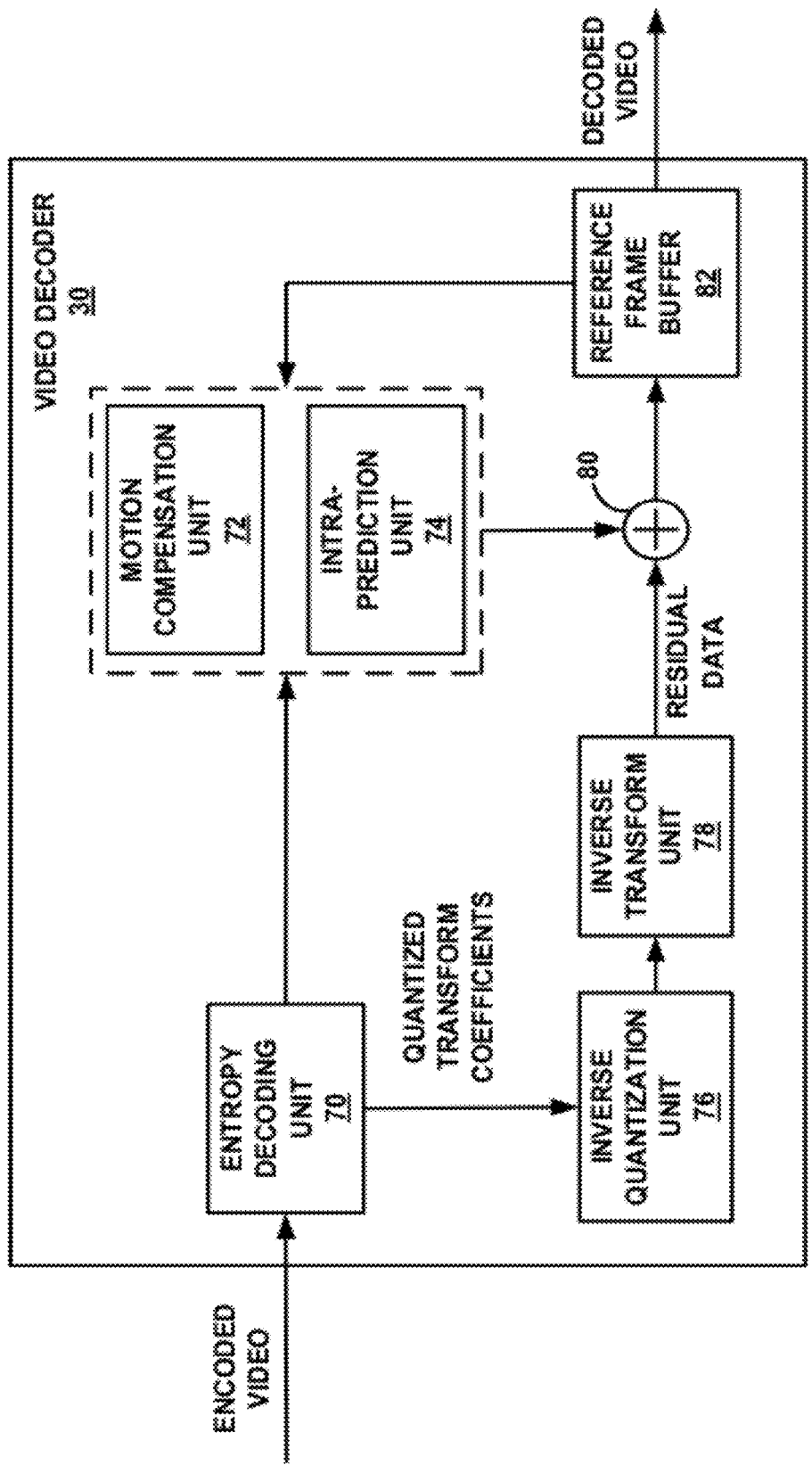
FIG. 3 is a block diagram illustrating an example of a video decoder that may use techniques for function-based definition of scan order for transform coefficients.

FIG. 3 is a block diagram illustrating an example of video decoder 30, which decodes an encoded video sequence. In the example of FIG. 3, video decoder 30 includes an entropy decoding unit 70, motion compensation unit 72, intra prediction unit 74, inverse quantization unit 76, inverse transform unit 78, reference frame buffer 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70. Intra-prediction unit 74 may generate prediction data for a current block of a current frame based on a signaled intra-prediction mode and data from previously decoded blocks of the current frame.

In some examples, entropy decoding unit 70 (or inverse quantization unit 76) may scan the received values using a scan mirroring the scan order used by entropy encoding unit 56 (or quantization unit 54) of video encoder 20. Although the scanning of coefficients may be performed in inverse quantization unit 76, scanning will be described for purposes of illustration as being performed by entropy decoding unit 70. In addition, although shown as separate functional units for ease of illustration, the structure and functionality of entropy decoding unit 70, inverse quantization unit 76, and other units of video decoder 30 may be highly integrated with one another. In the example of FIG. 3, video decoder 30 may define the scan order based on a function and one or more parameter values for the function. Again, the function may a single function, or one of multiple functions, defined by instructions or data stored by video decoder 30.

Video decoder 30 may receive, from video encoder 20, signaling that identifies one or more parameter values for the function and, in the case of multiple functions, identifying one of the functions to be used. Additionally, or alternatively, selection of a function or selection of one or more parameter values may be inferred by video decoder 30 based on characteristics of the coded video such as TU size, inter- or intra-coding mode, or other characteristics. An example in which video encoder 20 and video decoder 30 use a single function, and video encoder 30 signals one or more parameter values for the function, will be described for purposes of illustration.

Entropy decoding unit 70 may be configured to generate the scan order based on the function and one or more associated parameter values, and then apply the scan order to convert the 1D vector of transform coefficients into a 2D array of transform coefficients. For example, using the function, entropy decoding unit 70 may determine the scan order used by video encoder 20 for a particular transform block, or determine a scan order that is inverse to the scan order used by the video encoder. In either case, entropy decoding unit 70 uses the inverse of the scan order to scan the 1D vector into the 2D array. The 2D array of transform coefficients produced by entropy decoding unit 70 may be quantized and may generally match the 2D array of transform coefficients scanned by entropy encoding unit 56 of video encoder 20 to produce the 1D vector of transform coefficients.

Inverse quantization unit 76 inverse quantizes, i.e., de-quantizes, the quantized transform coefficients provided in the bitstream and decoded by entropy decoding unit 70. The inverse quantization process may include a conventional process, e.g., similar to the processes proposed for HEVC or defined by the H.264 decoding standard. The inverse quantization process may include use of a quantization parameter $QP_Y$ calculated by video encoder 20 for the CU to determine a degree of quantization and, likewise, a degree of inverse quantization that should be applied. Inverse quantization unit 76 may inverse quantize the transform coefficients either before or after the coefficients are converted from a 1D vector to a 2D array.

Inverse transform unit 58 applies an inverse transform, e.g., an inverse DCT, an inverse integer transform, an inverse KLT, an inverse rotational transform, an inverse directional transform, or another inverse transform. In some examples, inverse transform unit 78 may determine an inverse transform based on signaling from video encoder 20, or by inferring the transform from one or more coding characteristics such as block size, coding mode, or the like. In some examples, inverse transform unit 78 may determine a transform to apply to the current block based on a signaled transform at the root node of a quadtree for a CU including the current block. In some examples, inverse transform unit 78 may apply a cascaded inverse transform.

Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 and intra-prediction unit 74, in an HEVC example, may use some of the syntax information (e.g., provided by a quadtree) to determine sizes of LCUs used to encode frame(s) of the encoded video sequence, split information that describes how each CU of a frame of the encoded video sequence is split (and likewise, how sub-CUs are split), modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

Summer 80 combines the residual blocks with the corresponding prediction blocks generated by motion compensation unit 72 or intra-prediction unit 74 to form decoded blocks. If desired, a deblocking filter may also be applied to filter the decoded blocks in order to remove blockiness artifacts. The decoded video blocks are then stored in reference frame buffer 82, which provides reference blocks for subsequent motion compensation and also produces decoded video for presentation on a display device (such as display device 32 of FIG. 1).

Figure 4:
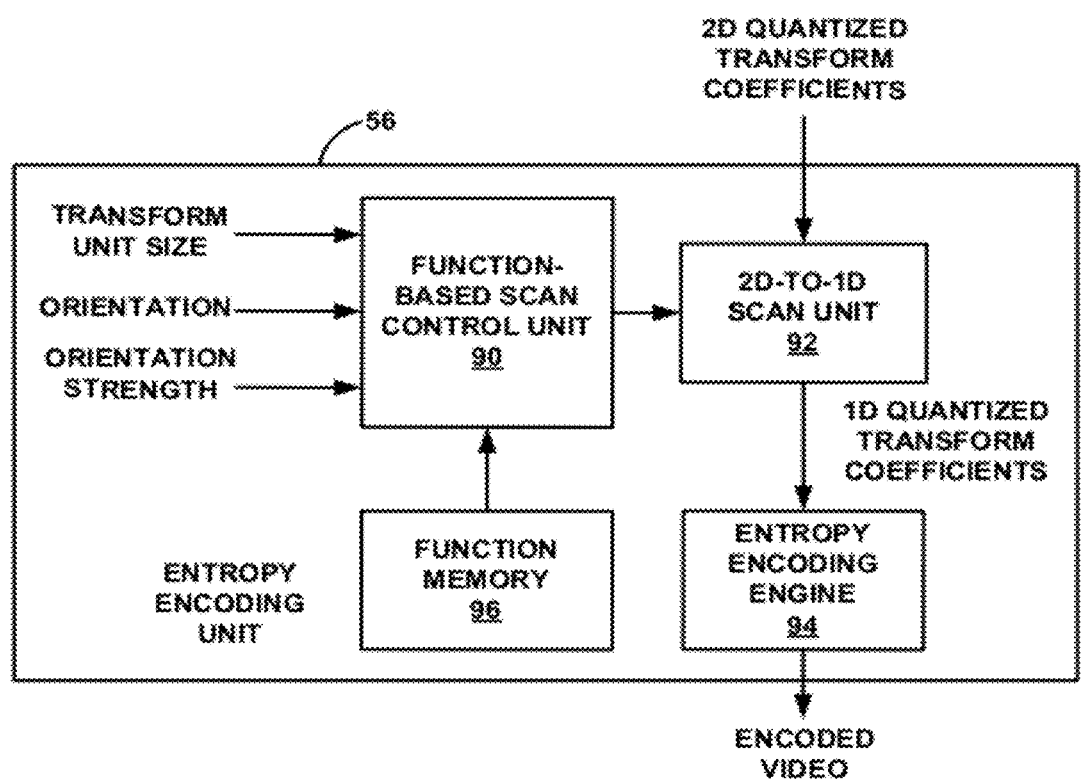
FIG. 4 is a block diagram illustrating an example of an entropy encoding unit for use in the video encoder of FIG. 2.

FIG. 4 is a block diagram illustrating an example of an entropy encoding unit 56 for use in the video encoder 20 of FIG. 2. FIG. 4 illustrates various functional aspects of entropy encoding unit 56 for determining a scan order based on a function and applying the scan order to convert a 2D array of transform coefficients to a 1D array of transform coefficients for use in encoding video data. As shown in FIG. 1, entropy encoding unit 56 may include a function-based scan control unit 90, a 2D-to-1D scan unit 92, an entropy coding engine 94, and a function memory 96.

Scan control unit 90 applies one or more parameter values to a function to produce a scan order. Function memory 96 stores instructions and/or data defining the function for generation of a scan order. For example, function memory 96 may store computer code specifying operations to perform to produce the scan order. Function-based scan control unit 90 retrieves the instructions from function memory 96 and applies the instructions to carry out the function. In particular, function-based scan control unit 90 applies one or more parameter values as inputs to the function and generates a scan order according to the function.

Function memory 96 may store instructions and/or data for a single function. Alternatively, function memory 96 may store instructions and/or data for multiple functions. In some cases, the functions may be configured to accept as inputs the same set of parameters, or different sets of parameters, including greater or lesser numbers of parameters. In some examples, scan control unit 90 may be configured to select one of multiple functions based on various coding characteristics such as bock size, inter- or intra-coding mode, transform, or the like. Scan control unit 90 may test a single function or multiple functions with various sets of parameter values to identify a scan order that produces a best, e.g., among those scan orders tested, or at least satisfactory, result for placement of coefficients in the 1D vector to support efficient coefficient coding.

In the example of FIG. 4, scan control unit 90, receives as input parameters, a transform unit size, a scan orientation and a scan orientation strength. Scan control unit 90 applies the values of the parameters to the function to generate the scan order. In some examples, scan control unit 90 may generate a single scan order based on the function and a single set of the parameters. In other examples, one or more of the values of the parameters can be selected based on various coding characteristics such as block size, inter- or intra-coding mode, transform, or the like.

In additional examples, the values of the parameters may be adjusted, e.g., in a controlled manner, to test a plurality of different scan orders produced by the function, and thereby identify a scan order that offers efficient placement of coefficients in the 1D vector to support entropy coding performance. In examples in which multiple sets of input parameters and/or functions are evaluated, entropy encoding unit 56 may be configured to select one of the scan orders based on any of a variety of criteria relating to efficient placement of coefficients in the 1D vector.

The scan order may be the particular scan order, among the multiple scan orders tested, that is found to produce the most efficient placement of coefficients, or a scan order that meets an efficiency threshold. For example, scan control unit 100 may test different scan orders until a satisfactory scan order is produced, i.e., in terms of efficient placement of coefficients. Scan unit 92 receives the scan order from scan control unit 90 and applies the scan order to convert the 2D array of coefficients to a serialized, 1D vector of the coefficients. Again, the 2D array of transform coefficients may include quantized transform coefficients. Similarly, the 1D vector may include quantized transform coefficients. Alternatively, the coefficients may be unquantized.

Entropy encoding engine 94 applies an entropy encoding process to the scanned coefficients, e.g., using CAVLC, CABAC or other processes. The entropy encoding process may be applied to the coefficients after they are fully scanned into the 1D vector, or as each coefficient is added to the 1D vector. In some cases, entropy encoding engine 94 may be configured to encode different sections of the 1D vector in parallel to promote parallelization of the entropy encoding process for increased speed and efficiency. Entropy encoding engine 94 produces a bitstream carrying the encoded video. The bitstream may be transmitted to another device or stored in a data storage archive for later retrieval. In addition to the residual transform coefficient data, the bitstream may carry motion vector data and various syntax elements useful in decoding the encoded video in the bitstream.

In addition, entropy encoding unit 56 may provide signaling in the encoded video bitstream to indicate the parameter values applied to the function to produce the scan order used to convert the 2D array of transform coefficients into the 1D array of transform coefficients. In some examples, the signaling may, alternatively or additionally, indicate the particular function used to produce the scan order. As examples, the signaling may explicitly signal the parameter values or function, or signal index values for video decoder 30 to look up the parameter values.

Functions and/or parameter values may be signaled, for example, as syntax elements at various levels, such as the frame, slice, LCU, CU level or TU level. If a single function is used, there may be no need to signal the function. Also, in some examples, it may be possible for video decoder 30 to infer some of the parameter values without signaling. To permit definition of different scan orders for different TU's, it may be desirable to signal such syntax elements at the TU level, e.g., in a TU quadtree header. Although signaling in the encoded video bitstream is described for purposes of illustration, information indicating the parameter values or function could be signaled out-of-band in side information.

Figure 5:
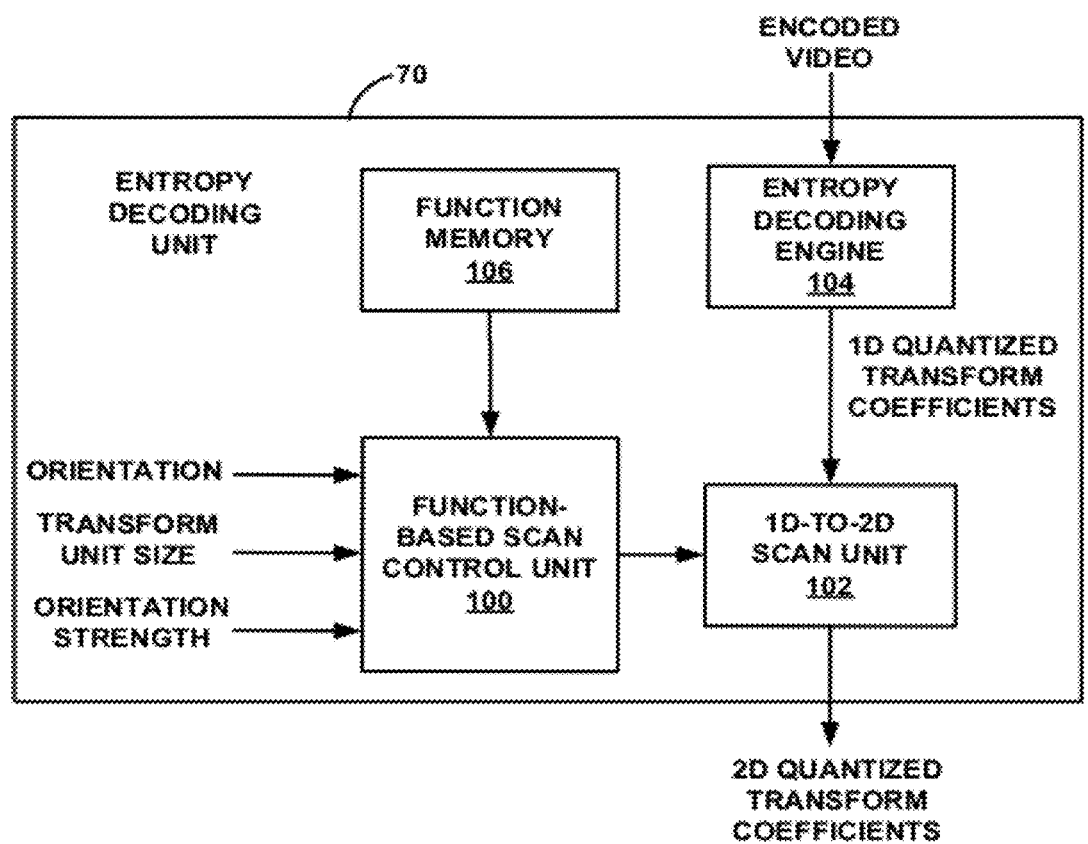
FIG. 5 is a block diagram illustrating an example of an entropy decoding unit for use in the video decoder of FIG. 3.

FIG. 5 is a block diagram illustrating an example of an entropy decoding unit for use in the video decoder of FIG. 3. FIG. 5 illustrates various example functional aspects of entropy decoding unit 70 for determining a scan order based on a function and applying the scan order to convert a 1D array of transform coefficients to a 2D array of transform coefficients for use in decoding video data. As shown in FIG. 1, entropy decoding unit 70 may include a function-based scan control unit 100, a 1D-to-2D scan unit 102, an entropy coding engine 104, and a function memory 106.

Entropy decoding engine 104 entropy decodes encoded video transmitted to video decoder 30 or retrieved by video decoder 30 from a storage device. For example, entropy decoding engine 104 may apply an entropy decoding process, e.g., CAVLC, CABAC or another process, to the bitstream carrying the encoded video to recover the 1D vector of transform coefficients. In addition to the residual transform coefficient data, entropy decoding engine 104 may apply entropy decoding to reproduce motion vector data and various syntax elements useful in decoding the encoded video in the bitstream. Entropy decoding engine 104 may determine which entropy decoding process, e.g., CAVLC, CABAC or another process, to select based on signaling in the encoded video bitstream or by inferring the appropriate process from other information in the bitstream.

Entropy decoding unit 70 may determine parameter values for a scan order function, and/or an indication of the particular function used, based on signaling in the encoded video bitstream. For example, entropy decoding unit 70 may receive syntax elements that explicitly signal parameter values and/or function identification or index values that permit lookup of such information. Again, although signaling in the encoded video bitstream is described for purposes of illustration, information indicating the parameter values or function could be received by entropy decoding unit 70 as out-of-band side information. If a single function is used, there may be no need to signal the function. Instead, entropy decoding unit 70 may rely on a single function stored at video decoder, e.g., in function memory 106. Also, in some examples, it may be possible for video decoder 30 to infer some of the parameter values without signaling.

Like memory 96 of FIG. 4, memory 106 of FIG. 5 may store instructions and/or data defining a function for generation of a scan order. Function memory 106 may store instructions and/or data for a single function. Alternatively, if function memory 106 stores instructions and/or data for multiple functions, the encoded video may include signaling that indicates which of the functions should be used to generate the scan order, or entropy decoding unit 70 may infer the particular function based on one or more coding characteristics.

Function-based scan control unit 100 retrieves the instructions from function memory 106 and applies the instructions to carry out the function to produce a scan order. Function-based scan control unit 100 applies one or more parameter values, some or all of which may be signaled in the encoded video bitstream, as inputs to the function and generates a scan order according to the function. Scan control unit 100 applies the parameter values to the specified function to produce the scan order.

Scan unit 102 receives the scan order from scan control unit 100 and applies the scan order, either directly or in an inverse manner, to control the scanning of coefficients. In the example of FIG. 5, scan control unit 100, receives as input parameters, a transform unit size, a scan orientation and a scan orientation strength. Using these parameter values and the function provided by function memory 106, video decoder 30 is able to reproduce the scan order used by video encoder 20.

In general, the function and parameter values are used to reproduce, in entropy decoding unit 70 of video decoder 30, the same or substantially the same scan order applied by entropy encoding unit 56 of video encoder 20, or an inverse scan order. Scan unit 102 then may apply the scan order either directly or in an inverse manner, to reconstruct, for a given TU, the 2D array of transform coefficients that was converted into the 1D array by video encoder 20. Again, the transform coefficients in the 1D array produced by scan unit 102 may be quantized. Inverse quantization may be applied to the coefficients prior to application of an inverse transform in video decoder 30.

The use of a function to define the scan order at video encoder 20 and video decoder 30 may permit a variety of scan orders to be produced according to different values of the function parameters. In this manner, video encoders 20 and video decoder 30 may provide at least some flexibility in formulating the scan order, relative to fixed scan orders such as zig-zag, horizontal and vertical scan orders. In addition, function-based definition of scan order may reduce the amount of memory needed to store information for generation of the scan order. Instead of storing the position of every coefficient in a scan order, in some examples, video encoder 20 and video decoder 30 may simply store the instructions and/or data for the function and generate the scan order on the fly according to the function and the parameters specified for the function.

Figure 6:
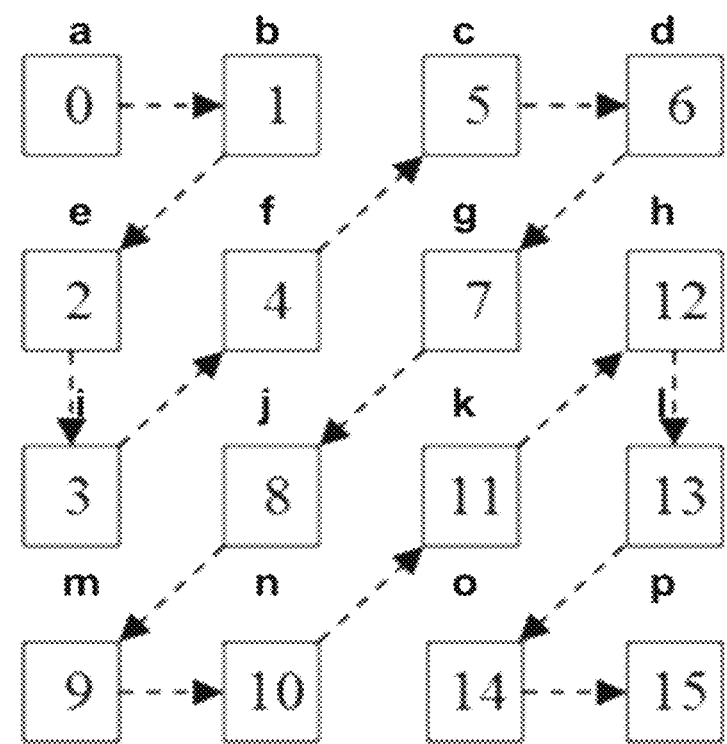
FIG. 6 is a diagram illustrating a zig-zag scan order for transform coefficients in an example transform unit.

FIG. 6 is a diagram illustrating a zig-zag scan order for transform coefficients in an example transform unit (TU). In FIG. 6, letters a-p indicate the identities of the coefficients, and numbers 1-15 indicate the order in which such coefficients are scanned. As shown in FIG. 6, to support entropy coding of a block of quantized transform coefficients, the zig-zag scan order generally proceeds from an upper left corner to a bottom right corner of the block in a diagonal, back-and-forth pattern to convert the 2D array of transform coefficients to a 1D vector of transform coefficients. For a DCT, there is a higher probability that non-zero coefficients will be positioned toward the upper left corner (i.e., in a low frequency region) of the transform unit, and that zero-valued coefficients will be positioned toward the lower right corner (i.e., in a higher frequency region), particularly after quantization. Hence, a zig-zag scan as illustrated in FIG. 6 increases the probability of grouping non-zero coefficients together at the beginning of the serialized run of coefficients.

Figure 7:
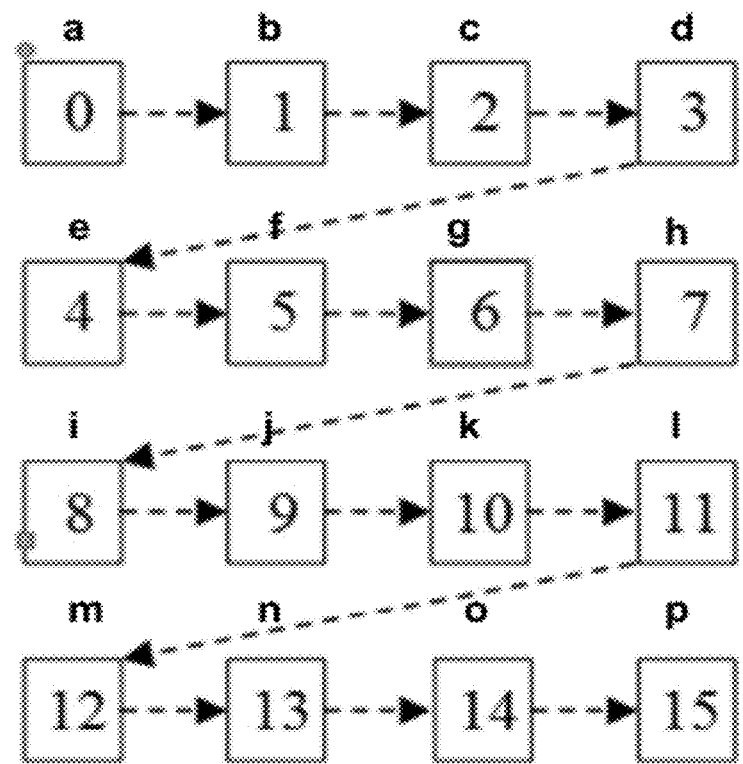
FIG. 7 is a diagram illustrating a horizontal scan order for transform coefficients in an example transform unit.

FIG. 7 is a diagram illustrating a horizontal scan order for transform coefficients in an example transform unit. In FIG. 7, letters a-p indicate the identities of the coefficients, and numbers 1-15 indicate the order in which such coefficients are scanned. As shown in FIG. 7, the horizontal scan order generally proceeds along the top row from the upper left corner to the upper right corner and then proceeds to scan from left to right in each succeeding row from extending from the top to the bottom of the TU.

Figure 8:
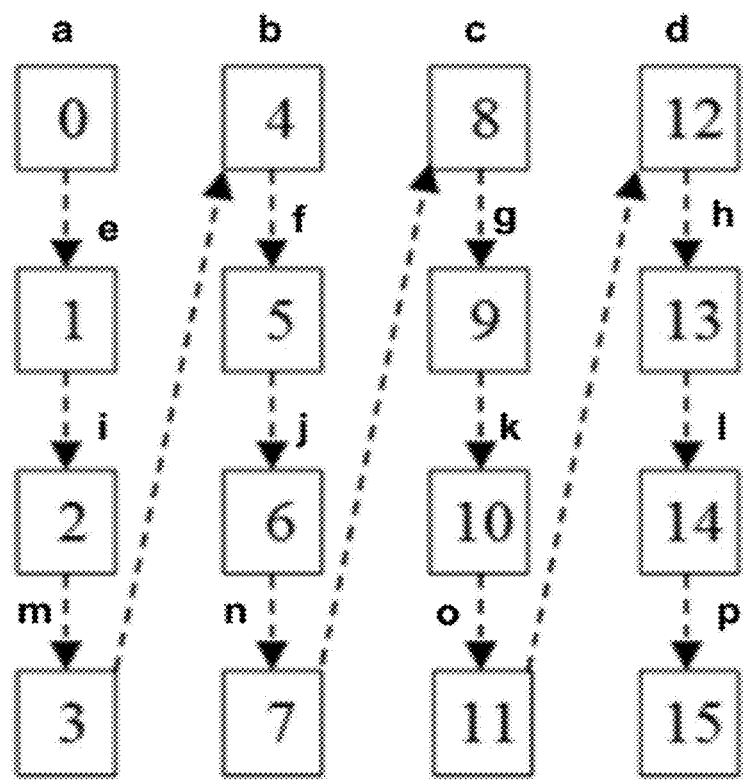
FIG. 8 is a diagram illustrating a vertical scan order for transform coefficients in an example transform unit.

FIG. 8 is a diagram illustrating a vertical scan order for transform coefficients in an example transform unit. In FIG. 8, letters a-p indicate the identities of the coefficients, and numbers 1-15 indicate the order in which such coefficients are scanned. As shown in FIG. 8, the vertical scan order generally proceeds along the left-hand column from the upper left corner to the lower left corner and then proceeds to scan from top to bottom in each succeeding row from extending from the left to the right the TU.

In the examples of FIGS. 6-8, the zigzag, horizontal and vertical scan orders are applied to 4×4 blocks of transform coefficients. The 4×4 block, having four rows and four columns of transform coefficients, is shown for illustration. In some examples, a transform unit may be much larger. For example, a transform unit may be 8×8, 16×16 or larger in size. Each square in FIGS. 6, 7 and 8 represents one of the sixteen transform coefficients and the number inside a each square (e.g., 0, 1, 2, etc.) shows the position of the transform coefficient in the scan order. In other words, the ascending order of the numbers in the squares shows the order in which the coefficients are scanned to form a serialized sequence of coefficients.

According to examples of this disclosure, a scan order for scanning transform coefficients (e.g., to code transform coefficient information such as level and sign) in a block of transform coefficients may be efficiently defined by a function. In some examples, as discussed above, video encoder 20 may specify values of the function parameters to define the scan order according to the function, and signal the values to video decoder 30. The use of a function may provide greater sophistication and flexibility in formulating the scan order.

A function with particular parameters may be used to generate the transform coefficient scan orders for different sizes of transform blocks, i.e., transform units. In one example, the function parameters may include one or more of transform block size, scan orientation and scan orientation strength. Given values for these parameters, a scan can be generated by the encoder and decoder using the function. A function that uses these parameters is described for purposes of illustration as an example of a function for construction of a scan order. However, other functions with different parameters also may be useful.

FIG. 9 is a diagram illustrating a scan order with a horizontal scan orientation. In FIG. 9, letters a-p indicate the identities of the coefficients, and numbers 1-15 indicate the order in which such coefficients are scanned. A scan order may have a particular orientation, such as horizontal or vertical, and an orientation strength that indicates a degree to which the scan order is biased toward the orientation. In the example of FIG. 9, the scan order is strongly biased toward the horizontal orientation in that each row is scanned in its entirety, i.e., all of the coefficients in the row are scanned, before the scan proceeds to the next row. In particular, using the 4×4 TU for illustration, the scan order proceeds across the uppermost row, scanning all positions from left to right in order 0-3, and then proceeds to scan all positions in the second row from left to right in order 4-7, then proceeds to scan all positions in the third row from left to right in order 8-11, and then proceeds to scan all positions in the fourth row from left to right in order 12-15.

FIG. 10 is a diagram illustrating a scan order with a lesser horizontal scan orientation strength than the scan order of FIG. 9. In FIG. 10, letters a-p indicate the identities of the coefficients, and numbers 1-15 indicate the order in which such coefficients are scanned. Like the scan order of FIG. 9, the scan order of FIG. 10 has a horizontal orientation. Hence, the scan orientation parameters for the scan orders of FIG. 9 and FIG. 10 are both horizontal. However, the horizontal orientation strength is reduced relative to that of FIG. 9. In other words, the scan order in FIG. 9 has a stronger orientation toward the horizontal direction than the scan order in FIG. 10.

As discussed above, according to the scan order in FIG. 9, coefficients of a current row are all coded before coding any coefficient at the next row below. In particular, all coefficients in each row are scanned consecutively (e.g., coefficients 0, 1, 2, 3 in FIG. 9) before any coefficient in a lower row is scanned. However, according to the scan order in FIG. 10, some coefficients at the later rows are coded before all coefficients at a current, i.e., earlier, row are coded.

For example, in FIG. 10, the first (left-most) coefficient e from the second row is scanned, at scan order position 3, before the last (right-most) coefficient d in the first (top-most) row is scanned at scan order position 4. Also, the first coefficient in the third row is scanned at scan order position 6, before the third and fourth coefficients (from left to right) are scanned in the second row at scan order positions 7 and 10, respectively.

The second coefficient j in the third row is also scanned at scan order position 8, and the first coefficient m in the fourth row is scanned at scan order position 9, before the last coefficient h in the second row is scanned at scan order position 10. The remaining scan order is evident from the numbers presented in FIG. 10. Although the scan order in FIG. 10 also favors the horizontal direction, its orientation is not as strong as the orientation of the scan order in FIG. 9.

In FIG. 9, the orientation parameter value is horizontal and the orientation strength parameter value could be characterized as "high," or presented as a higher or highest number on a numeric scale. In FIG. 10, the orientation parameter value is horizontal and the orientation strength parameter value could be characterized as "medium," or as a medium number on a numeric scale. For signaling by video encoder 20, the horizontal or vertical indication for the orientation parameter value may be represented by a one-bit flag, e.g., with 1 for horizontal and 0 for vertical, or vice versa. The strength for the orientation strength parameter value could be represented, for example, by a numeric value that is signaled in the bitstream, either explicitly or as an index to one of a plurality of numeric values, e.g., in a table or other data structure stored at video decoder 30.

The illustration in FIGS. 9 and 10 above describes the case of scan orders oriented in a horizontal direction. Substantially the same description can also be applied to scan orders oriented in the vertical direction, if the discussion concerning rows is applied instead to columns extending from left to right in the 4×4 TU. Accordingly, for brevity, the cases in which vertically oriented scan orders have different vertical orientation strengths are not illustrated, although such cases may be addressed by the techniques described in this disclosure.

In general, the scan of a block of transform coefficients may start from the upper-left corner position. According to this disclosure, if the scan orientation parameter indicates that the scan order is horizontally oriented, then the scan order continues horizontally along the row direction. Otherwise, if the orientation if vertical, the scan order continues vertically along the column direction.

In addition, based on the orientation strength parameter, a scan order function may be configured such that a threshold value may be derived for each row for the horizontal orientation (or each column for the vertical orientation). In the following description, the case of a horizontally oriented scan will be addressed, but the same description can also be applied to a vertically oriented scan by simply replacing "row" with "column."

The threshold value derived from the orientation strength parameter may be used to specify how many coefficients at a current row should be coded before coding a coefficient at the next row. After the threshold number of coefficients is reached, scanning of coefficients at the current row and the next row may be ordered in an interleaved manner.

FIG. 11 is a diagram illustrating an example of function-based scan order defined based on scan orientation and scan orientation strength parameters. In FIG. 11, letters a-p indicate the identities of the coefficients, and numbers 1-15 indicate the order in which such coefficients are scanned. In the example of FIG. 11, a function is configured to determine a scan direction based on the scan orientation parameter, and generate a threshold value based on the orientation strength parameter value to determine the precise scan order. In some examples, different scan order functions may be selected for different block sizes, e.g., TU sizes. Alternatively, a given scan order function may apply the block size to adjust a scan order. Again, a 4×4 TU is shown for purposes of illustration, but without limitation as to application of function-based scan order definition to larger TU's.

For the example of FIG. 11, it is assumed that the scan orientation is horizontal and the orientation strength parameter value is specified to be a value of 4. Based on the orientation strength parameter value, a video encoder 20 or video decoder 30 may derive a threshold value for each row according to the function. In this example, the function is configured such that the first (top) row threshold value is set to be equal to the orientation strength value, i.e., equal to 4. Then, according to the function, a gradually decreasing value can be assigned to the threshold value for each of the following rows from top to bottom in the TU.

In other examples, the threshold value may be set according to block size (e.g., TU size) or according to a combination of block size and orientation strength as input parameter to the scan order function. In addition, orientation determines a general direction of the scan and may serve as another input parameter to the scan order function. Adjustment of the threshold value according to the orientation strength parameter will be described with reference to FIG. 11 for purposes of illustration.

In the example of FIG. 11, the threshold value decreases by 1 following each row, i.e., for each successive row below the top row. However, it should be noted that other functions for assigning the threshold value for each row are also possible. For example, the function may assign the same threshold value to each row, or specify that the threshold value should decrease by 2 for each row, or the like. Also, decreases in the threshold for successive rows could be linear or nonlinear according to functions defining different scanning schemes.

As mentioned above, according to a given scan order function, the derived threshold value for each row may be used to specify how many coefficients at a current row should be scanned before scanning a coefficient at the next row. Again, the threshold may be a function of the value of the orientation strength parameter. In this example, after the threshold is reached for a given current row, i.e., a number of coefficients equal to the threshold value have been scanned in the current row, coefficients at the current row and the next row are scanned in an interleaved manner. In FIG. 11, the threshold values for first, second, third and fourth rows are indexed as Thres[0], Thres[1], Thres[2], and Thres[3], respectively.

In the example shown in FIG. 11, the threshold value is variable over the progression of the scan from row to row. The threshold value for the first row is equal to 4, but the threshold values for the second, third and fourth rows progressive decrease to values of 3, 2 and 1, respectively. With a threshold of 4 for the first row, all of the four coefficients a, b, c and d in the first row are to be scanned before any coefficient at other rows below the first row are scanned. These coefficients a, b, c, and d in the first row in FIG. 11 are numbered 0, 1, 2, 3 in the scan order. For the second row, the threshold value is 3. So, the first three coefficients at the second row are coded before any coefficients in the following rows are coded, and are numbered 4, 5, 6 in the scan order.

After scanning only these three coefficients e, f, and g for the second row, per the limit set by the threshold value of 3 for the second row, the scan proceeds to the third row. In particular, the first coefficient i in the third row is coded, and is numbered 7 in the scan order. Since the threshold value for the third row is 2 and there have not been two coefficients coded yet at this time in the third row, the scan comes back to the second row and codes the next coefficient (i.e., the fourth coefficient h in the second row), and numbers this coefficient as number 8 in the scan order, as shown in FIG. 11.

Next, having completed scanning of all of the coefficients in the second row, the function specifies that the scan goes to the third row and codes the next coefficient (i.e., the second coefficient j in the third row) at this row. This scanned coefficient j is numbered 9 in the scan order, as indicated by FIG. 11. At this point, there have been two coefficients coded at the third row (the first coefficient i in the third row at scan order position 7 and the second coefficient j in the third row at scan order position 9). Based on the threshold value of 2 for the third row, the scan goes to the first coefficient m at the fourth row. The position of the first coefficient m in the fourth row is numbered as 10 in the scan order.

Continuing from this position, given the threshold of 1 for the fourth row, the scan goes back to the third row. In particular, the scan goes back and forth between the third row and the fourth row in an interleaved, alternating manner, as shown in FIG. 11, scanning the third coefficient k in the third row at scan order position 11, then scanning the second coefficient n in the fourth row at scan order position 12, then returning to the third row to scan the fourth coefficient l at scan order position and 13, and then scanning the third and fourth coefficients o, p in the fourth row at scan order positions 14 and 15.

In the example of FIG. 11, the scan does not proceed to a later row until a number of transform coefficients equivalent to the threshold for the preceding row have been scanned in the preceding row. According to the function that produces the scan order of FIG. 11, the threshold is variable from row to row, and decreases incrementally from top to bottom.

Figure 12:
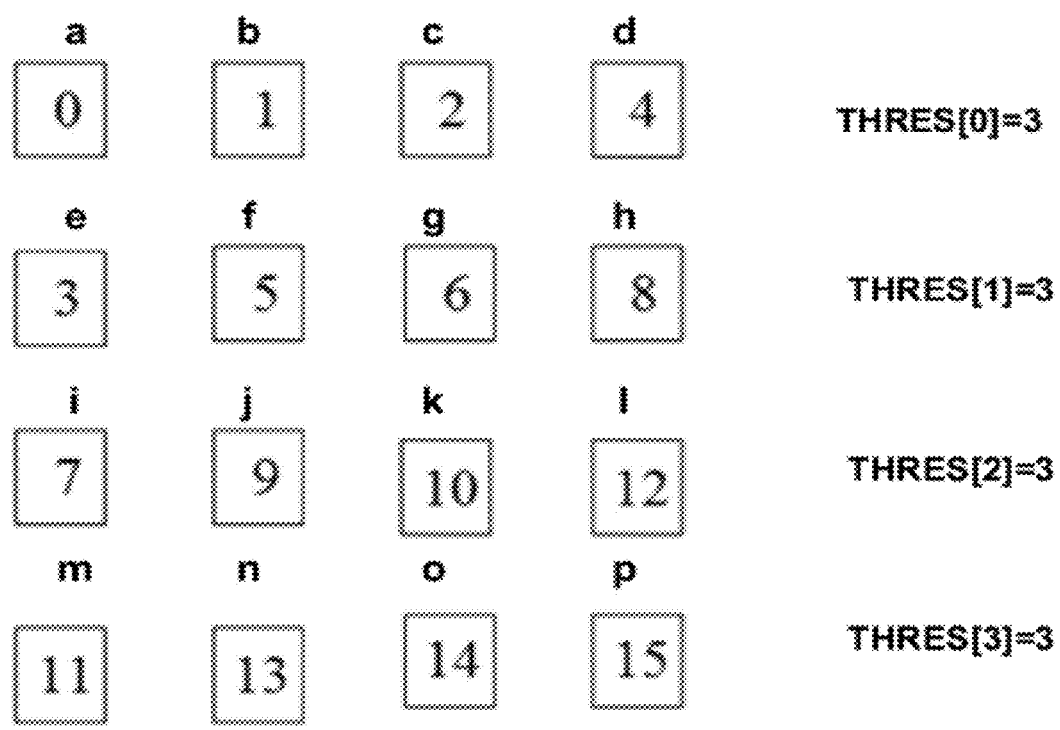
FIG. 12 is a diagram illustrating another example of function-based scan order defined based on scan orientation and scan orientation strength parameters.

FIG. 12 is a diagram illustrating another example of function-based scan order defined based on scan orientation and scan orientation strength parameters. In FIG. 12, letters a-p indicate the identities of the coefficients, and numbers 1-15 indicate the order in which such coefficients are scanned. Based on the rules described above for the function associated with the scan order of FIG. 11, it can be seen that the threshold value for each row (or column) determines the resulting scan order pattern. FIG. 12 provides an alternative example in which the threshold value for each row is set to be a fixed value of 3. In other words, in FIG. 12, every row has the same threshold of 3, which may be determined based on an orientation strength parameter. In the example of FIG. 12, the orientation strength parameter values is 3, and the scan order function applies the orientation strength parameter value to produce a fixed threshold for each row of the TU.

In this case, with a fixed threshold, the scan order proceeds to scan the first three coefficients a, b, c in the first row at scan order positions 0, 1 and 2, satisfying the threshold value of 3 for the first row. Then, the first coefficient e in the second row at scan order position 3 is scanned before scanning the fourth coefficient d in the first row at scan order position 4. The scan then returns to the second row to scan the second and third coefficients f, g in the second row, at which point the threshold value of 3 for the second row is satisfied.

At this point, the threshold of 3 for the second row is satisfied. Accordingly, the scan proceeds to the next row, i.e., the third row, and scans the first coefficient i. The scan then returns to the second row, and scans the fourth coefficient h. The process continues in a similar manner through the third and fourth rows. In each case, the scan does not proceed to a later row until three transform coefficients have been scanned in the preceding row, consistent with the threshold value applicable to the row. The scan results in a conversion of the 2D array of coefficients in the transform block to a 1D array, i.e., vector, of coefficients. Again, in the example of FIG. 12, the threshold value is fixed at 3 for all of the rows.

In the examples of FIGS. 11 and 12, the threshold used to direct the scan order is determined based on a scan orientation strength parameter. As an alternative to using orientation strength as a parameter, the function may also directly take an array of threshold values as parameters to generate a scan order. Hence, video encoder 20 may specify an orientation strength parameter for the function or an array of threshold values of the function.

In each case, the function may set a threshold value for each row to direct a scan. The approach of using an array of threshold values as an input parameter for the scan order function may provide more freedom in generating a scan order based on the rules described above. However, in practice, it is found that, based on orientation strength value, a gradually decreasing threshold value for each row (or column) may be good enough in generating efficient scan orders for video coding.

The examples in FIGS. 11 and 12 show the cases for a 4×4 block. However, it is apparent that this concept may be directly extended to other sizes of blocks, such as 8×8, 16×16, 32×32. In these cases, the block size may be one of the parameters for selection of a scan order function, among multiple available scan order functions, or as an input to the scan order function, in that the block size determines the number of coefficients to be scanned and may be used to set a threshold value, e.g., in conjunction with a orientation strength parameter value.

At video encoder 20, the scan order shown in FIG. 11 would rearrange the 2D array of coefficients (ordered abcdefghijklmnop in the case of a strictly horizontal scan or raster scan) into a 1D array ordered as abcdefgihjmknlop. The scan order shown in FIG. 12, at video encoder 20, would rearrange the 2D array of coefficients (ordered abcdefghijklmnop in the case of a strictly horizontal scan) into a 1D array ordered as abcedfgihjkmlnop).

In the examples of FIGS. 11 and 12, a video decoder 30 would apply the scan order in an inverse manner to scan the 1D array into a 2D array. For FIG. 12, for example, video decoder 30 would apply the threshold of 3 for each row and first scan coefficients abc into the first row, then scan e into the second row before scanning the next coefficient d into the first row, then scan coefficients f and g into the second row, then scan coefficient i into the third row before scanning coefficient h into the second row, and so forth.

Hence, the threshold generated by the scan order function, based on the scan orientation strength, can be applied in a similar manner for 2D-to-1D scanning by video encoder 20 and 1D-to-2D scanning by video decoder 30. In either case, the scan order generated according to the function and associated parameters controls scanning of coefficients by the video encoder or video decoder, as applicable.

The following is an example of a C code implementation of a function-based scan order technique as illustrated in this disclosure. Among the function parameters, order1D is the scan order array, which stores the scan order positions of the coefficients to be scanned from the 2D transform block. The parameter blkSize is the size of a transform block, i.e., in terms of the number N of rows and columns forming the N×N block. The parameter dir is the scan orientation, e.g., 1 to indicate horizontal and 0 to indicate vertical. The parameter w is the orientation strength parameter. Inside the function, array iThres[ ] saves the derived threshold value for each row or column of the transform block. Function Min( ) returns the smaller one of two input values.

```
static void getScan(UInt *order1D, int blkSize, int dir, int w)
{
    int iLineNum = 0;
    int iPosIdx = 0;
    int iLinePos[64];
    int iThres[64];
    memset(iLinePos, 0, sizeof(int)*blkSize);
    // assign threshold value
    for(int i=0; i<blkSize; i++)
    {
        iThres[i] = w;
        if(w>2) w--;
    }
    // get scan order
    while(1)
    {
        if((iLineNum == 0 || iLinePos[iLineNum-1] >=
        Min(iThres[iLineNum-1], blkSize))
    && iLinePos[iLineNum] < blkSize )
        {
            if(dir==1) // horizontal
                order1D[iPosIdx] = iLineNum*blkSize +
                iLinePos[iLineNum];
            else if(dir==0) // vertical
                order1D[iPosIdx] = iLinePos[iLineNum]*blkSize +
                iLineNum;
            iPosIdx ++;
            iLinePos[iLineNum] ++;
        }
        if(iLineNum == blkSize - 1 && iLinePos[iLineNum] >=
        blkSize)
            break;
        iLineNum ++;
        if(iLineNum >= blkSize)
            iLineNum = 0;
    }
}
```

In the above code, depending on whether the scan orientation is horizontal or vertical, iLineNum indicates a row (or a column) index of a current coefficient position in the block, and iLinePos[iLineNum] indicates the column (or row) index of a current coefficient position. In this code, iPosIdx indicates the scan order index. To assign the threshold size for each row or column, iThres[i] is initially set to be equal to a weight w that is specified according to the scan orientation strength parameter. In this example, as the scan progresses among the rows (or columns) of the scan, depending on whether the scan orientation is horizontal or vertical, the weight w is decremented. In other examples, the weight w may remain fixed. In the example code above, the weight is decremented for each successive row or column so long as w remains greater than two.

An example with horizontal scanning that scans coefficients from left to right in each successive row will be described. In this example, the weight w may be n for a first row 0, and then be decremented to n−1 for the second row 1, decremented to n−2 for the third row 2, and so forth, until the weight w reaches two, at which point the weight w remains fixed at 2 for any remaining rows. For each successive row (or column) i, the threshold for that row i is set to be equal to w, as decremented for each row subject to the minimum w value of 2. The process continues along successive rows for incrementing values of i while i remains less than the block size (blksize), where the block size corresponds to the number N of rows and columns in an N×N square block. In other examples, the process may be adapted for rectangular (e.g., N×M) block shapes.

If the scan is in the first row (iLineNum=0), or the position of the current coefficient (iLinePos[iLineNum−1] in the previous row is greater than or equal to the minimum of the applicable threshold (iThres[iLineNum−1] for the previous row and the block size (blkSize, indicating the last coefficient position in a row according to the N×N size of the block), and the position of the current coefficient in the current row (iLinePos[iLineNum]) is less than the block size ((blkSize, indicating the last coefficient position in a row according to the N×N size of the block), then the process proceeds to scan the current coefficient located at position (iLineNum, iLinePos[iLineNum]) into the one-dimensional array of coefficients. The array order1D[iPosIdx] stores coefficient raster scan position based on scan order.

If the scan orientation is horizontal (dir==1), the current position in the scan order (order1D[iPosIdx]) is set to correspond to the coefficient at a position determined according the number of the current row times the block size (i.e., coefficients per row) and the column index of the current coefficient within the current row. For example, if the scan resides in the row n and the block size is m×m, the current position in the scan order array would be order1D[iPosIdx]=n*m+the column index of the current coefficient in the row. If the column index of the current coefficient in the row is p, then the current position in the scan order array would point to (n*m+p)th coefficient overall from the top left corner to the current position, assuming a horizontal raster scan.

A similar process may be applied for a vertical scan (dir==0). However, the position in the array order1D[iPosIdx] is set to be the coefficient with a raster scan position corresponding to iLinePos[iLineNum]*blkSize+iLineNum, where the physical meaning of iLineNum and iLinePos[iLineNum] are exchanged relative to that in a horizontal scan. More particularly, iLinePos[iLineNum] indicates the row index of the current coefficient position and iLineNum indicates the column index of the current coefficient. In this example, iPosIdx and iLinePos[iLineNum] are each incremented during each pass through the loop.

If the last row and last coefficient in that row are reached (iLineNum==blkSize−1 && iLinePos[iLineNum]>=blockSize), the scanning process stops (break). If not, the row number is incremented (iLineNum++), and the loop repeats. If the row index iLineNum is greater than or equal to the block size, iLineNum is set to zero.

This disclosure describes the use of a function for generating scan orders with certain orientation and orientation strength. In practice, the generated scan orders may often be used together with a standard zigzag scan. For example, for intra prediction blocks, a natural and efficient coding scheme may be to select a scan order for a block based on its intra prediction directions (or prediction modes). Based on the direction of intra prediction, a scan order with certain corresponding orientation can be selected and used in coding the transform coefficients of the block.

On the encoder side, coding of the transform coefficients may comprise encoding the transform coefficients according to the scan order to form the one-dimensional array of the transform coefficients. On the decoder side, coding the transform coefficient may comprise decoding the transform coefficients according to the scan order to reconstruct a two-dimensional array of the transform coefficients in the transform block.

An advantage of using function based scan orders is the convenience of signaling. If a new scan order needs to be signaled by the encoder to the decoder, instead of signaling the exact order itself, only the function parameter values need to be signaled from the encoder to the decoder. For even further simplicity, a lookup table of function parameters may be used at both the encoder and decoder side. In this case, to signal a scan order, only an index to the function parameter lookup table needs to be signaled from the encoder to the decoder. Such signaling can be provided at different levels of the video data, such as sequence level, picture level, slice level, coding unit level, or other coding levels.

Using a predefined scan order function as described in this disclosure, a method or apparatus for coding video data defines a scan order for transform coefficients associated with a block of residual video data based at least in part on the predefined function and one or more parameter values for the function, and scans the transform coefficients according to the scan order for use in a video coding process. The function may be prestored or generated dynamically, but is predefined in the sense that it is defined for use by the video coder in generating the scan order.

At the encoder side, the transform coefficients reside in a 2D array, e.g., are organized in a transform block such as a TU, and the scan order function defines a scan order for scanning the transform coefficients into a 1D array. At the decoder side, the transform coefficients reside in a one-dimensional array, e.g., are organized according to a one-dimensional array, and the scan order function defines a scan order for scanning the transform coefficients from the 1D array into a 2D array. For example, a decoder may scan the transform coefficients to reproduce an arrangement of transform coefficients from a TU.

If the coding apparatus is video encoder 20, the video encoder may be configured to signal, in encoded video, the scanned transform coefficients in the one-dimensional array, and the one or more parameter values for the function to define the scan order. If the coding apparatus is video decoder 30, the video decoder may be configured to receive, in encoded video, the scanned transform coefficients in the 1D array, and signaling indicating the one or more parameter values for the function to define the scan order.

The block of residual video data includes residual values indicating differences between pixel values of a coded block of video data and a predictive block of video data. The transform coefficients may include coefficients produced by a transform applied to the block of residual video data. The one or more parameter values may include a size of the block of residual data, a scan orientation, and a scan orientation strength. The scan orientation may be vertical or horizontal, for example, the scan orientation strength may be a value, or a numeric scale, that indicates how strongly the scan is biased toward the orientation.

Defining the scan order based at least in part on the predefined function may include determining a threshold based at least in part on the orientation strength, defining a number of the transform coefficients to be scanned with respect to each of a plurality of rows or columns of the block before scanning transform coefficients to be scanned with respect to later rows or columns of the block based on the threshold.

This threshold may be fixed or variable, from row to row (or column to column), and may be implemented, for example, in the manner described with reference to FIGS. 11 and 12. Hence, the threshold may be set at a fixed value for each successive one of the rows or columns scanned in the block, or the value of the threshold may be reduced for each successive one of the rows or columns scanned in the block relative to a value of the threshold for a preceding one of the rows or columns scanned in the block.

Scanning with respect to a row may refer to scanning from a row in a 2D array of coefficients to a 1D array of coefficients, e.g., at video encoder 20, or scanning from a 1D array of coefficients to a row in a 2D array of coefficients, e.g., at video decoder 30. The scan order applied by video decoder 30 for 1D-to-2D conversion may be inverted, in effect, relative to the scan order applied by video encoder 20 for 2D-to-1D conversion. The coefficients do not necessarily need to be saved physically in a 2D or 1D array, as applicable, in memory. Rather, it may be sufficient that the encoder or decoder, with a known scan order, is able to code the coefficients in an appropriate order, e.g., relative to an arrangement of coefficients in a TU.

Using a threshold, scanning the transform coefficients according to the scan order may include scanning, with respect to a first row or column of the block, a number of the coefficients equivalent to the threshold. If the number of transform coefficients in the first row or column is greater than the threshold, the scan order may include scanning one or more of the coefficients with respect to a second row or column in an alternating manner with unscanned coefficients with respect to the first row or column.

The threshold for the second row or column may be reduced relative to that for the first row or column, and the scan order may include scanning a number of unscanned coefficients with respect to the second row or column equivalent to the reduced threshold before scanning unscanned coefficients with respect to a third row or column. Hence, scanning of all coefficients of a given row does not need to be completed before scanning coefficients in another row. If the threshold for a given row is met, scanning of the next row can be started, even though scanning of all coefficients in the given row is not fully completed. This process may continue for remaining rows or columns in the 2D array, either for 2D-to-1D conversion or 1D-to-2D conversion.

Figure 13:
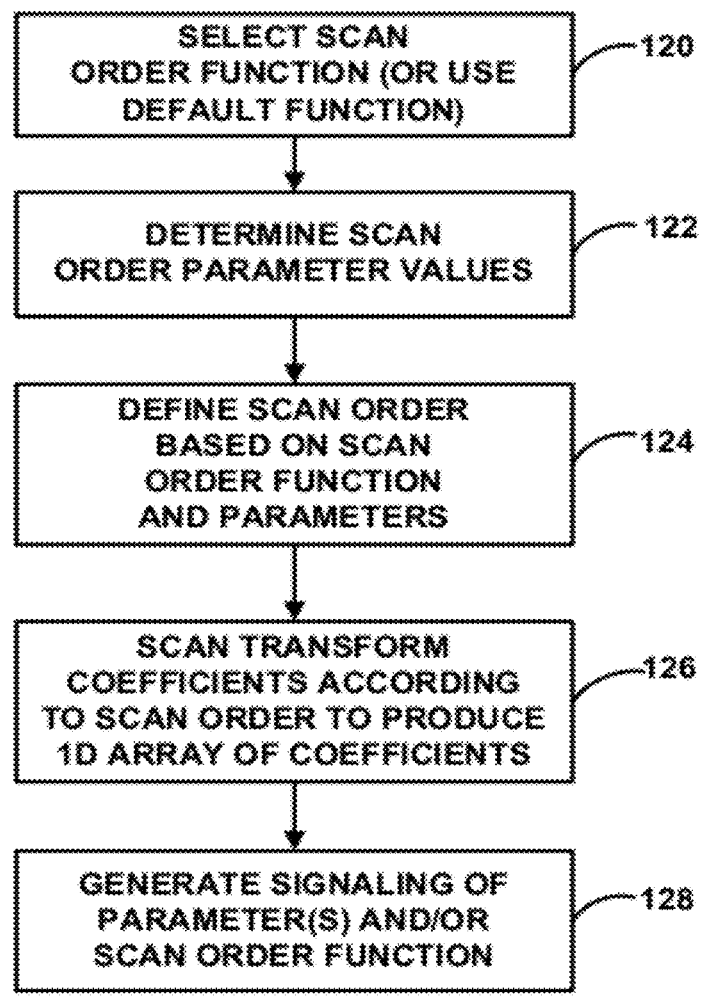
FIG. 13 is a flowchart illustrating an example method for function-based definition of scan order for transform coefficients in a video encoder.

FIG. 13 is a flowchart illustrating an example method for function-based definition of scan order for transform coefficients in video encoder 20. In general, video encoder 20 may be configured to define a scan order for transform coefficients associated with a block of residual video data based at least in part on a predefined function and one or more parameter values for the function, and scan the transform coefficients according to the scan order for use in a video coding process. As shown in FIG. 13, video encoder 20 may select a scan order function based on one or more criteria, such as a coding criteria, e.g., block size, coding mode, transform, or the like, or select a default function that is to be used generally for all blocks (120). Hence, video encoder 20 may select one of a plurality of functions or use a default function, which may be a single function in some cases.

Video encoder determines values of scan order parameters for the scan order function (122). The values of the scan order parameters may be fixed or adjustable. In some examples, the scan order parameters may be selected based on an evaluation of different combinations of scan order parameters by video encoder 20. In particular, video encoder 20 may apply various combinations of parameters on a trial basis, and evaluate the effects of such parameters in producing an efficient scan of the coefficients for entropy coding. For example, video encoder 20 may select a combination of parameters that yield the most efficient placement of non-zero coefficients and zero-valued coefficients to support efficient entropy coding, or select the first combination (among those tested) that yields a satisfactory degree of efficiency, e.g., relative to a predetermined threshold.

The evaluation of different combinations of parameters by video encoder 20 need not be exhaustive, but may sample various combinations of the parameters in an effort to identify an efficient set of parameters. In other examples, the various combinations of parameters may be selected to maximize or minimize some function representative of efficient placement of coefficients in the 1D vector. The various combinations of parameters may be adjusted in one-dimensional manner, i.e., by adjusting individual parameters individually while keeping other parameters fixed, or in a multi-dimensional manner, i.e., by adjusting multiple parameters simultaneously. Video encoder 20 may update the values of the parameters and/or the selected function on a block-by-block, slice-by-slice, frame-by-frame basis, or according to some other basis for adjusting the parameter values and/or selecting the scan order function.

Also, in some examples, the scan order parameters may be adjustable at least in part according to any of a variety of coding criteria, such as block size, coding mode, transform or the like. Additionally, or alternatively, in some examples, video encoder 20 may select the values of the scan order parameters based on statistics collected for previously coded blocks, e.g., statistics relating to efficient compaction of non-zero coefficients toward the start of the 1D vector. In this manner, video encoder 20 may select the parameter such that the resulting scan order produced by the scan order function is biased toward efficient placement of coefficients. In some cases, parameter values selected based on coding criteria and/or statistics may be selected for use with the function, or serve as a starting point for evaluation of different parameters, as described above.

Based on the selected scan parameter values and the scan order function, video encoder 20 defines the scan order for a block of transform coefficients, e.g., a TU in HEVC or a block in other coding standards (124). Video encoder 20 scans the 2D array of transform coefficients according to the scan order to produce a 1D array of the coefficients (126). The 1D array may be conceptual. In particular, the 1D array may not need to be produced physically and/or saved in memory in video encoder or decoder. Rather, the coefficients may be stored in a different arrangement. it may be sufficient for the encoder and/or decoder to know the scan order such that the encoder or decoder knows the order to code each coefficient from a 2D array, e.g., relative to a 1D array. For example, entropy encoding unit 56 or quantization unit 54 may generate the scan order and apply it to scan the coefficients. A video encoder, e.g., video entropy encoding unit 56, may generate signaling to communicate one or more of the selected scan order parameters and/or the selected function to a decoder (128). The signaling may be encoded by video encoder 20 as one or more syntax elements in the encoded video bitstream that is transmitted to another device or recorded on a data storage device for later retrieval by another device.

Figure 14:
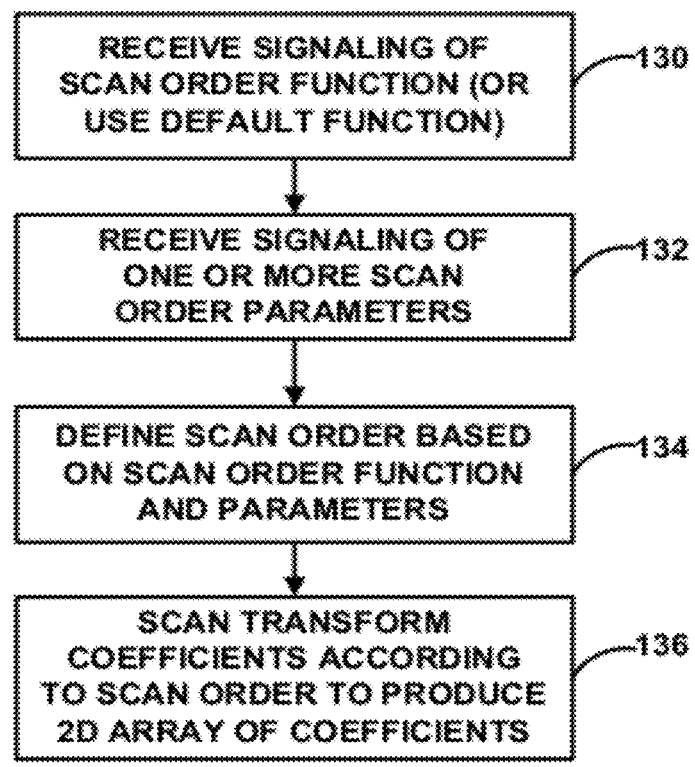
FIG. 14 is a flowchart illustrating an example method for function-based definition of scan order for transform coefficients in a video decoder.

FIG. 14 is a flowchart illustrating an example method for function-based definition of scan order for transform coefficients in a video decoder 30. As shown in FIG. 14, video decoder 130 may receive signaling of a scan order function in the encoded bitstream or use a default function (130). Video decoder 30 also may receive signaling of one or more scan order parameters (132) for use with the function. As mentioned previously, in some examples, one or more of the scan order parameters may be inferred by video decoder 30 and as a result there may be no need to explicitly signal the parameters, e.g., in the encoded bitstream. In other examples, however, all of the scan order parameters may be signaled to video decoder 30 in the encoded video bitstream. Entropy decoding unit 70 may entropy decode the encoded video bitstream to obtain the signaled parameters for use in decoding the encoded video.

With further reference to FIG. 14, video decoder 30 defines a scan order based on the scan order function and the one or more parameters (134), where the one or more parameters are applied to the function to produce the scan order. Video decoder 30 scans a 1D array of transform coefficients, for a transform block received in the encoded video bitstream, according to the scan order to produce a 2D array of the coefficients (136) for use in video decoding. In this manner, video decoder 30 defines a scan order for transform coefficients associated with a block of residual video data based at least in part on a predefined function and one or more parameter values for the function, and scans the transform coefficients according to the scan order for use in a video coding process.

Figure 15:
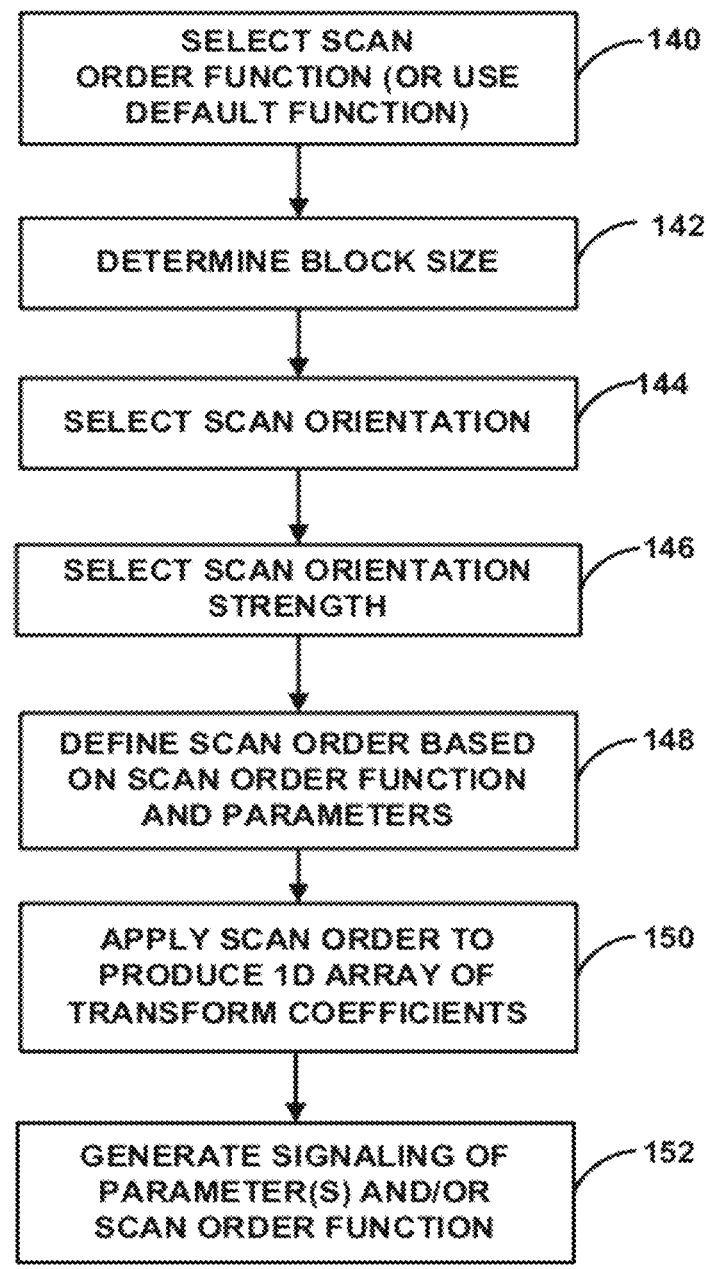
FIG. 15 is a flowchart illustrating another example method for function-based definition of scan order for transform coefficients in a video encoder.

FIG. 15 is a flowchart illustrating another example method for function-based definition of scan order for transform coefficients in video encoder 20. In the example of FIG. 15, video encoder 20 selects the scan order function or uses a default function (140), and determines, as a parameter value, block size (142), and selects, as further parameter values, transform orientation (144) and transform orientation strength (146). Based on the scan order function and these parameters, video encoder 20 defines a scan order (148), and applies the scan order to a 2D array of transform coefficients in a block to produce a 1D array of transform coefficients (150). Video encoder 20 may generate signaling of one or more of the parameters and/or the scan order function (152), and encode the signaled information in an encoded video bitstream, e.g., as one or more syntax elements.

Figure 16:
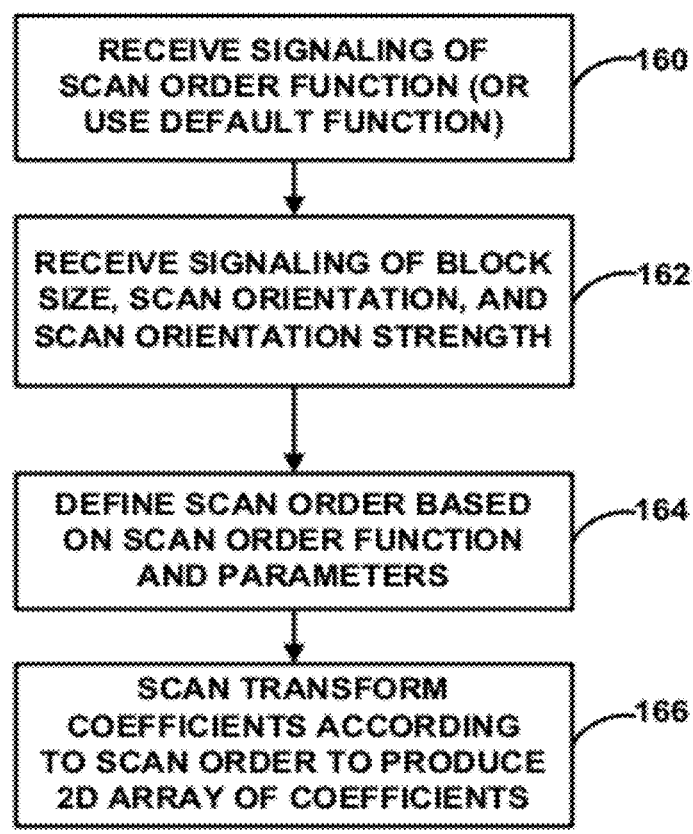
FIG. 16 is a flowchart illustrating another example method for function-based definition of scan order for transform coefficients in a video decoder.

FIG. 16 is a flowchart illustrating another example method for function-based definition of scan order for transform coefficients in video decoder 30. In the example of FIG. 16, video decoder 30 receives signaling of the scan order function or uses a default function (160). Video decoder 30 may receive signaling of values for the scan order parameters such as transform block size (e.g., TU size), scan orientation, scan orientation strength (162). Based on the scan order function and the parameters, video decoder 30 defines the scan order (164), and scans transform coefficients in a 1D array according to the scan order to produce a 2D array of coefficients (166) for use in video decoding. The values of the parameters and/or the selected function may be updated, according to the signaling and/or based on inference of one or more parameters, on a block-by-block, slice-by-slice, frame-by-frame basis, or according to some other basis for updating parameter values and/or selecting the scan order function.

In one or more examples, the functions described in this disclosure may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of coding video data, the method comprising:
    selecting, by a video encoder or a video decoder and based at least in part on a predefined function and parameter values for the function, a scan order for transform coefficients associated with a block of residual video data, the parameter values including a size of the block of residual video data, an orientation of the scan order, and an orientation strength of the scan order, wherein the orientation of the scan order designates whether the scan order is mainly oriented horizontally or vertically in terms of scanning across rows or columns of a block of the transform coefficients, and wherein the orientation strength of the scan order indicates a degree to which the scan order is biased toward the orientation of the scan order; and
    scanning, by the video encoder or the video decoder, the transform coefficients according to the scan order for use in a video coding process for the video data.

2. The method of claim 1, wherein the transform coefficients reside in a two-dimensional array, and scanning the transform coefficients comprises scanning the transform coefficients into a one-dimensional array in a video encoder according to the scan order.

3. The method of claim 2, further comprising:
    providing, in encoded video, the scanned transform coefficients in the one-dimensional array; and
    signaling, in the encoded video, the orientation of the scan order and the orientation strength of the scan order.

4. The method of claim 1, wherein the transform coefficients reside in a one-dimensional array, and scanning the transform coefficients comprises scanning the transform coefficients into a two-dimensional array in the video decoder according to the scan order.

5. The method of claim 4, further comprising receiving, in encoded video, the scanned transform coefficients in the one-dimensional array, and signaling that indicates the orientation of the scan order and the orientation strength of the scan order.

6. The method of claim 4, further comprising receiving, in encoded video, the scanned transform coefficients in the one-dimensional array, and inferring the parameter values for the function to select the scan order.

7. The method of claim 1, wherein the block of residual video data includes residual values indicating differences between pixel values of a coded block of video data and a predictive block of video data, the transform coefficients include coefficients produced by a transform applied to the block of residual video data.

8. The method of claim 1, wherein selecting the scan order based at least in part on the predefined function comprises:
    determining a threshold based at least in part on the orientation strength; and defining a number of the transform coefficients to be scanned with respect to each of a plurality of rows or columns of the block of transform coefficients before scanning transform coefficients to be scanned with respect to later rows or columns of the block of transform coefficients based on the threshold.

9. The method of claim 8, further comprising setting the threshold at a fixed value for each successive one of the rows or columns scanned in the block of transform coefficients.

10. The method of claim 8, further comprising reducing a value of the threshold for each successive one of the rows or columns scanned in the block of transform coefficients relative to a value of the threshold for a preceding one of the rows or columns scanned in the block of transform coefficients.

11. The method of claim 8, wherein scanning the transform coefficients according to the scan order comprises:
    scanning, with respect to a first row or column of the block of transform coefficients, a number of the coefficients equivalent to the threshold;
    when the number of transform coefficients in the first row or column is greater than the threshold, scanning one or more of the coefficients with respect to a second row or column in an alternating manner with unscanned coefficients with respect to the first row or column; and
    reducing the threshold for the second row or column and scanning a number of unscanned coefficients with respect to the second row or column equivalent to the reduced threshold before scanning unscanned coefficients with respect to a third row or column.

12. The method of claim 1, wherein scanning the transform coefficients according to the scan order comprises coding at least one of levels or signs of the transform coefficients in the scan order.

13. An apparatus for coding video data, the apparatus comprising:
    a storage medium configured to store the video data; and
    a video coder configured to:
        select, based at least in part on a predefined function and parameter values for the function, a scan order for transform coefficients associated with a block of residual video data, the parameter values including a size of the block of residual video data, an orientation of the scan order, and an orientation strength of the scan order, wherein the orientation of the scan order designates whether the scan order is mainly oriented horizontally or vertically in terms of scanning across rows or columns of a block of the transform coefficients, and wherein the orientation strength of the scan order indicates a degree to which the scan order is biased toward the orientation of the scan order, and
        scan the transform coefficients according to the scan order for use in a video coding process for the video data.

14. The apparatus of claim 13, wherein the transform coefficients reside in a two-dimensional array, and the video coder comprises a video encoder configured to scan the transform coefficients into a one-dimensional array according to the scan order.

15. The apparatus of claim 14, wherein the video encoder is configured to:
    provide, in encoded video, the scanned transform coefficients in the one-dimensional array; and
    signal, in the encoded video, the orientation of the scan order and the orientation strength of the scan order.

16. The apparatus of claim 13, wherein the transform coefficients reside in a one-dimensional array, and the video coder comprises a video decoder configured to scan the transform coefficients into a two-dimensional array according to the scan order.

17. The apparatus of claim 16, wherein the video decoder is configured to receive, in encoded video, the scanned transform coefficients in the one-dimensional array, and signaling that indicates the orientation of the scan order and the orientation strength of the scan order.

18. The apparatus of claim 16, wherein the video decoder is configured to:
    receive, in encoded video, the scanned transform coefficients in the one-dimensional array, and
    infer the parameter values for the function to select the scan order.

19. The apparatus of claim 13, wherein the block of residual video data includes residual values indicating differences between pixel values of a coded block of video data and a predictive block of video data, and the transform coefficients include coefficients produced by a transform applied to the block of residual video data.

20. The apparatus of claim 13, wherein the video coder is configured to determine a threshold based at least in part on the orientation strength, and define a number of the transform coefficients to be scanned with respect to each of a plurality of rows or columns of the block of transform coefficients before scanning transform coefficients to be scanned with respect to later rows or columns of the block of transform coefficients based on the threshold.

21. The apparatus of claim 20, wherein the video coder is configured to set the threshold at a fixed value for each successive one of the rows or columns scanned in the block of transform coefficients.

22. The apparatus of claim 20, wherein the video coder is configured to reduce a value of the threshold for each successive one of the rows or columns scanned in the block of transform coefficients relative to a value of the threshold for a preceding one of the rows or columns scanned in the block of transform coefficients.

23. The apparatus of claim 20, wherein the video coder is configured to:
    scan, with respect to a first row or column of the block of transform coefficients, a number of the coefficients equivalent to the threshold;
    when the number of transform coefficients in the first row or column is greater than the threshold, scan one or more of the coefficients with respect to a second row or column in an alternating manner with unscanned coefficients with respect to the first row or column; and
    reduce the threshold for the second row or column and scanning a number of unscanned coefficients with respect to the second row or column equivalent to the reduced threshold before scanning unscanned coefficients with respect to a third row or column.

24. The apparatus of claim 20, wherein the video coder comprises a video decoder.

25. The apparatus of claim 20, wherein the video coder comprises a video encoder.

26. The apparatus of claim 13, wherein the video coder is configured to code at least one of levels or signs of the transform coefficients in the scan order.

27. An apparatus for coding video data, the apparatus comprising:
    means for selecting, based at least in part on a predefined function and parameter values for the function, a scan order for transform coefficients associated with a block of residual video data, the parameter values including a size of the block of residual video data, an orientation of the scan order, and an orientation strength of the scan order, wherein the orientation of the scan order designates whether the scan order is mainly oriented horizontally or vertically in terms of scanning across rows or columns of a block of the transform coefficients, and wherein the orientation strength of the scan order indicates a degree to which the scan order is biased toward the orientation of the scan order; and means for scanning the transform coefficients according to the scan order for use in a video coding process for the video data.

28. The apparatus of claim 27, wherein the transform coefficients reside in a two-dimensional array, and the means for scanning the transform coefficients comprises means for scanning the transform coefficients into a one-dimensional array in a video encoder according to the scan order.

29. The apparatus of claim 28, further comprising means for providing, in encoded video, the scanned transform coefficients in the one-dimensional array, and signaling, in the encoded video, the orientation of the scan order and the orientation strength of the scan order.

30. The apparatus of claim 27, wherein the transform coefficients reside in a one-dimensional array, and the means for scanning the transform coefficients comprises means for scanning the transform coefficients into a two-dimensional array in a video decoder according to the scan order.

31. The apparatus of claim 30, further comprising means for receiving, in encoded video, the scanned transform coefficients in the one-dimensional array, and signaling that indicates the orientation of the scan order and the orientation strength of the scan order.

32. The apparatus of claim 27, wherein the block of residual video data includes residual values indicating differences between pixel values of a coded block of video data and a predictive block of video data, and the transform coefficients include coefficients produced by a transform applied to the block of residual video data.

33. The apparatus of claim 27, wherein the means for selecting the scan order based at least in part on a predefined function comprises means for determining a threshold based at least in part on the orientation strength, and wherein the means for selecting the scan order comprises means for defining a number of the transform coefficients to be scanned with respect to each of a plurality of rows or columns of the block of transform coefficients before scanning transform coefficients to be scanned with respect to later rows or columns of the block of transform coefficients based on the threshold.

34. The apparatus of claim 33, further comprising means for reducing a value of the threshold for each successive one of the rows or columns scanned in the block of transform coefficients relative to a value of the threshold for a preceding one of the rows or columns scanned in the block of transform coefficients.

35. The apparatus of claim 33, wherein the means for scanning the transform coefficients according to the scan order comprises:

means for scanning, with respect to a first row or column of the block of transform coefficients, a number of the coefficients equivalent to the threshold;

means for scanning, when the number of transform coefficients in the first row or column is greater than the threshold, one or more of the coefficients with respect to a second row or column in an alternating manner with unscanned coefficients with respect to the first row or column; and means for reducing the threshold for the second row or column and scanning a number of unscanned coefficients with respect to the second row or column equivalent to the reduced threshold before scanning unscanned coefficients with respect to a third row or column.

36. A non-transitory computer-readable medium comprising instructions to cause a video coder to:

select, based at least in part on a predefined function and parameter values for the function, a scan order for transform coefficients associated with a block of residual video data, the parameter values including a size of the block of residual video data, an orientation of the scan order, and an orientation strength of the scan order, wherein the orientation of the scan order designates whether the scan order is mainly oriented horizontally or vertically in terms of scanning across rows or columns of a block of the transform coefficients, and wherein the orientation strength of the scan order indicates a degree to which the scan order is biased toward the orientation of the scan order; and scan the transform coefficients according to the scan order for use in a video coding process for video data.

37. The non-transitory computer-readable medium of claim 36, wherein the transform coefficients reside in a two-dimensional array, and the instructions cause the video coder to scan the transform coefficients into a one-dimensional array in a video encoder according to the scan order, and wherein the instructions cause the video coder to provide, in encoded video, the scanned transform coefficients in the one-dimensional array, and signal, in the encoded video, the orientation of the scan order and the orientation strength of the scan order.

38. The non-transitory computer-readable medium of claim 36, wherein the transform coefficients reside in a one-dimensional array, and the instructions cause the video coder to scan the transform coefficients into a two-dimensional array in a video decoder according to the scan order, and wherein the instructions cause the video coder to receive, in encoded video, the scanned transform coefficients in the one-dimensional array, and signaling that indicates the orientation of the scan order and the orientation strength of the scan order.

39. The non-transitory computer-readable medium of claim 36, wherein the block of residual video data includes residual values indicating differences between pixel values of a coded block of video data and a predictive block of video data, and the transform coefficients include coefficients produced by a transform applied to the block of residual video data.

* * * * *